US012698436B2

(12) United States Patent
Yaguchi

(10) Patent No.: US 12,698,436 B2
(45) Date of Patent: Aug. 4, 2026

(54) METHOD OF EXCHANGING LIGANDS, QUANTUM DOT COMPOSITION, AND ELECTROLUMINESCENT ELEMENT

(71) Applicant: SHARP KABUSHIKI KAISHA, Sakai City (JP)

(72) Inventor: Yuma Yaguchi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 684 days.

(21) Appl. No.: 18/022,725

(22) PCT Filed: Sep. 4, 2020

(86) PCT No.: PCT/JP2020/033529
§ 371 (c)(1),
(2) Date: Feb. 22, 2023

(87) PCT Pub. No.: WO2022/049715
PCT Pub. Date: Mar. 10, 2022

(65) Prior Publication Data
US 2023/0303918 A1     Sep. 28, 2023

(51) Int. Cl.
*C09K 11/02* (2006.01)
*B82Y 20/00* (2011.01)
*B82Y 40/00* (2011.01)

(52) U.S. Cl.
CPC ............. *C09K 11/025* (2013.01); *B82Y 20/00* (2013.01); *B82Y 40/00* (2013.01)

(58) Field of Classification Search
CPC .............................. C09K 11/025; B82Y 40/00
See application file for complete search history.

(56) References Cited

U.S. PATENT DOCUMENTS

2021/0163771 A1*    6/2021    Haben ..................... C01B 25/08

FOREIGN PATENT DOCUMENTS

| CN | 110386886 | * | 10/2019 |
| CN | 110885673 | * | 3/2020 |
| WO | 2017086362 A1 | | 5/2017 |

* cited by examiner

*Primary Examiner* — C Melissa Koslow
(74) *Attorney, Agent, or Firm* — ScienBiziP, P.C.

(57) ABSTRACT

A method of exchanging ligands includes a step of mixing a QD composition in which intermediate ligands and QDs are dissolved in a water solvent with a target-ligand-substituting solvent in which target ligands are dissolved, to replace the intermediate ligands with the target ligands. The target ligands do not dissolve in the water solvent and are soluble in different solvents depending on whether or not the target ligands are coordinated to the QDs, and the target-ligand-substituting solvent dissolves the target ligands not coordinated to the QDs and does not dissolve the target ligands coordinated to the QDs.

12 Claims, 8 Drawing Sheets

FIG. 1

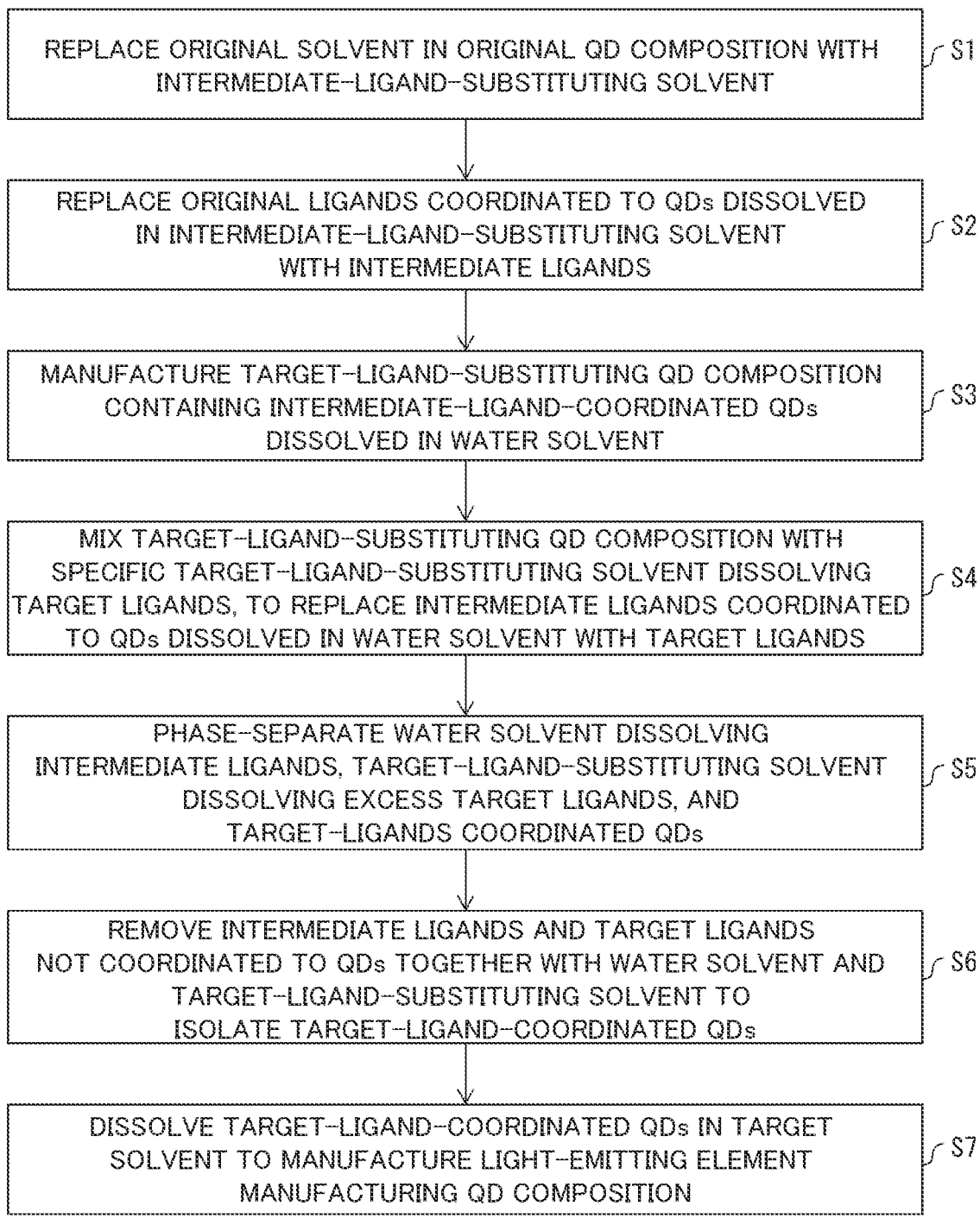

REPLACE ORIGINAL SOLVENT IN ORIGINAL QD COMPOSITION WITH
INTERMEDIATE-LIGAND-SUBSTITUTING SOLVENT — S1

REPLACE ORIGINAL LIGANDS COORDINATED TO QDs DISSOLVED
IN INTERMEDIATE-LIGAND-SUBSTITUTING SOLVENT
WITH INTERMEDIATE LIGANDS — S2

MANUFACTURE TARGET-LIGAND-SUBSTITUTING QD COMPOSITION
CONTAINING INTERMEDIATE-LIGAND-COORDINATED QDs
DISSOLVED IN WATER SOLVENT — S3

MIX TARGET-LIGAND-SUBSTITUTING QD COMPOSITION WITH
SPECIFIC TARGET-LIGAND-SUBSTITUTING SOLVENT DISSOLVING
TARGET LIGANDS, TO REPLACE INTERMEDIATE LIGANDS COORDINATED
TO QDs DISSOLVED IN WATER SOLVENT WITH TARGET LIGANDS — S4

PHASE-SEPARATE WATER SOLVENT DISSOLVING
INTERMEDIATE LIGANDS, TARGET-LIGAND-SUBSTITUTING SOLVENT
DISSOLVING EXCESS TARGET LIGANDS, AND
TARGET-LIGANDS COORDINATED QDs — S5

REMOVE INTERMEDIATE LIGANDS AND TARGET LIGANDS
NOT COORDINATED TO QDs TOGETHER WITH WATER SOLVENT AND
TARGET-LIGAND-SUBSTITUTING SOLVENT TO
ISOLATE TARGET-LIGAND-COORDINATED QDs — S6

DISSOLVE TARGET-LIGAND-COORDINATED QDs IN TARGET
SOLVENT TO MANUFACTURE LIGHT-EMITTING ELEMENT
MANUFACTURING QD COMPOSITION — S7

FIG. 4(Prior Art)

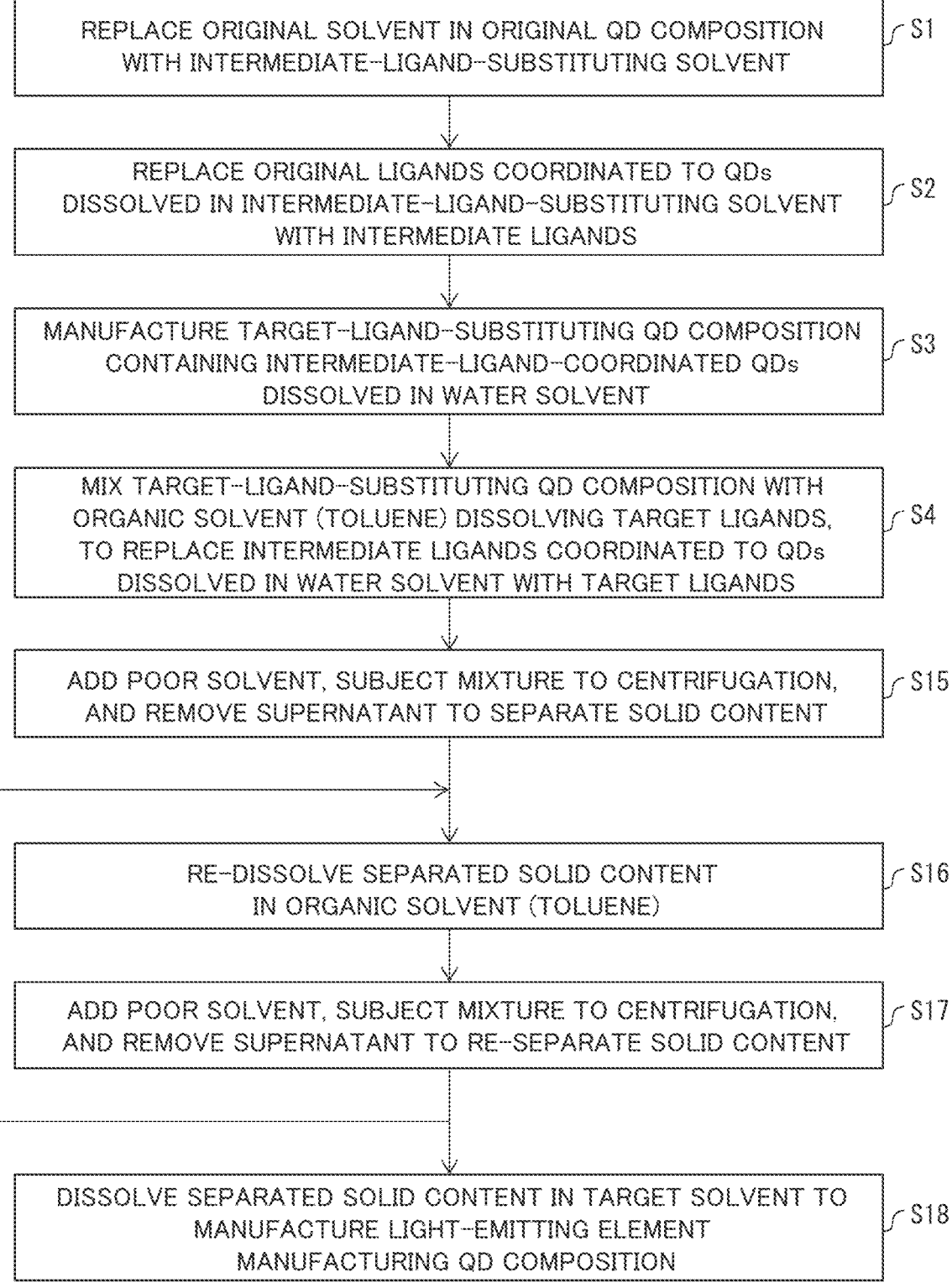

REPLACE ORIGINAL SOLVENT IN ORIGINAL QD COMPOSITION WITH INTERMEDIATE–LIGAND–SUBSTITUTING SOLVENT ⌐S1

REPLACE ORIGINAL LIGANDS COORDINATED TO QDs DISSOLVED IN INTERMEDIATE–LIGAND–SUBSTITUTING SOLVENT WITH INTERMEDIATE LIGANDS ⌐S2

MANUFACTURE TARGET–LIGAND–SUBSTITUTING QD COMPOSITION CONTAINING INTERMEDIATE–LIGAND–COORDINATED QDs DISSOLVED IN WATER SOLVENT ⌐S3

MIX TARGET–LIGAND–SUBSTITUTING QD COMPOSITION WITH ORGANIC SOLVENT (TOLUENE) DISSOLVING TARGET LIGANDS, TO REPLACE INTERMEDIATE LIGANDS COORDINATED TO QDs DISSOLVED IN WATER SOLVENT WITH TARGET LIGANDS ⌐S4

ADD POOR SOLVENT, SUBJECT MIXTURE TO CENTRIFUGATION, AND REMOVE SUPERNATANT TO SEPARATE SOLID CONTENT ⌐S15

RE–DISSOLVE SEPARATED SOLID CONTENT IN ORGANIC SOLVENT (TOLUENE) ⌐S16

ADD POOR SOLVENT, SUBJECT MIXTURE TO CENTRIFUGATION, AND REMOVE SUPERNATANT TO RE–SEPARATE SOLID CONTENT ⌐S17

DISSOLVE SEPARATED SOLID CONTENT IN TARGET SOLVENT TO MANUFACTURE LIGHT–EMITTING ELEMENT MANUFACTURING QD COMPOSITION ⌐S18

METHOD OF EXCHANGING LIGANDS, QUANTUM DOT COMPOSITION, AND ELECTROLUMINESCENT ELEMENT

TECHNICAL FIELD

The present disclosure relates to methods of exchanging ligands, quantum dot compositions, and electroluminescent elements.

BACKGROUND ART

Various technologies have been developed in relation to quantum-dot-containing electroluminescent elements. Such electroluminescent elements include a light-emitting layer formed by applying a quantum dot composition containing quantum dots and a solvent.

Quantum dots are commercially available. Commercially available quantum dots are typically provided in the form of a quantum dot composition. Quantum dots can also be synthesized by any suitable method. For example, quantum dots are synthesized by a wet process in which the particle diameters of the quantum dots are controlled by coordinating ligands to the surface of the quantum dots (surface modification). The ligands also serve as a dispersant for improving the dispersibility of the quantum dots in the quantum dot composition. The ligands are used also to improve the surface stability and storage stability of the quantum dots.

To disperse, in a given solvent, these synthesized or commercially obtained quantum dots to which ligands are coordinated, the ligands coordinated to the quantum dots need to be replaced by ligands that are suited to the solvent to be used.

Patent Literature 1: PCT International Application Publication No. WO2017/086362 discloses substituting surface-stabilizing ligands for nanocrystal-synthesizing ligands formed on the surface of quantum dots of a core/shell type (nanocrystals) in a shell forming step for the quantum dots, to electrostatically stabilize the surface of the quantum dots.

CITATION LIST

Patent Literature

SUMMARY

Technical Problem

After the quantum dots are synthesized or after the ligands are replaced, the solvent contains a large amount of excess ligands that have not been coordinated to the quantum dots and are floating in the solvent.

These excess ligands have adverse effects, for example, on ease in forming a film in the manufacture of the electroluminescent element and on the carrier injection, emission uniformity, and element lifetime of the resultant electroluminescent element.

It is however not easy to adequately remove excess ligands. Purification by, for example, gel permeation chromatography (GPC) using a column, although being laborious, presents difficulty in thoroughly separating excess ligands and quantum dots and can only achieve moderate purification efficiency.

Other methods of removing excess ligands (free ligands) are also known, including the method described in Patent Literature 1 of repeating a washing step that involves adding a poor solvent to a quantum dot composition after a ligand exchange reaction to precipitate quantum dots, removing the resultant supernatant liquid, and dispersing the remaining mixture again in a good solvent.

However, this method is not only inefficient, but can also damage quantum dots in the process of repeatedly removing excess ligands. For instance, the repeated implementation of the washing step may strip away the necessary ligands that are already coordinated to quantum dots after the ligand exchange, thereby possibly leading to adversely affecting, for example, the capability and stability of the quantum dots.

In view of this situation, the present disclosure, in an aspect thereof, has an object to provide a quantum dot composition, containing no excess ligands, that achieves an improved purification efficiency over known quantum dot compositions and that restrains damage to the quantum dots caused by the repeated removal of excess ligands in comparison with known quantum dot compositions and also to provide a method of exchanging ligands by which such a quantum dot composition can be obtained. In another aspect thereof, the present disclosure has a further object to provide an electroluminescent element that delivers improved luminescence properties over known electroluminescent elements by including a light-emitting layer, containing no excess ligands, that achieves an improved purification efficiency over known light-emitting layers and that restrains damage to the quantum dots caused by the repeated removal of excess ligands in comparison with known light-emitting layers.

Solution to Problem

To address these issues, the present disclosure, in one aspect thereof, is directed to a method of exchanging ligands, the method including a second-ligand-substituting step of mixing a quantum dot composition in which first ligands and quantum dots are dissolved in a water solvent with a first organic solvent in which second ligands are dissolved, to replace the first ligands with the second ligands, wherein the second ligands do not dissolve in the water solvent and are soluble in different solvents depending on whether or not the second ligands are coordinated to the quantum dots, and the first organic solvent dissolves the second ligands not coordinated to the quantum dots and does not dissolve the second ligands coordinated to the quantum dots.

To address the issues, the present disclosure, in another aspect thereof, is directed to a quantum dot composition including: quantum dots; ligands; and a solvent, wherein the ligands do not dissolve in a water solvent and are soluble in different solvents depending on whether or not the ligands are coordinated to the quantum dots, and the solvent contains: a first organic solvent that dissolves the ligands not coordinated to the quantum dots and that does not dissolve the ligands coordinated to the quantum dots: and as a primary component, a second organic solvent that dissolves the quantum dots to which the ligands are coordinated.

To address the issues, the present disclosure, in a further aspect thereof, is directed to an electroluminescent element including a light-emitting layer including: quantum dots; and ligands, wherein the ligands do not dissolve in a water solvent and are soluble in different solvents depending on whether or not the ligands are coordinated to the quantum dots, and the light-emitting layer contains a first organic solvent that dissolves, as an impurity, the ligands not coordinated to the quantum dots and that does not dissolve the ligands coordinated to the quantum dots.

Advantageous Effects

The present disclosure, in an aspect thereof, can provide a quantum dot composition, containing no excess ligands, that achieves an improved purification efficiency over known quantum dot compositions and that restrains damage to the quantum dots caused by the repeated removal of excess ligands in comparison with known quantum dot compositions and can also provide a method of exchanging ligands by which such a quantum dot composition can be obtained. In another aspect thereof, the present disclosure can provide an electroluminescent element that delivers improved luminescence properties over known electroluminescent elements by including a light-emitting layer, containing no excess ligands, that achieves an improved purification efficiency over known light-emitting layers and that restrains damage to the quantum dots caused by the repeated removal of excess ligands in comparison with known light-emitting layers.

BRIEF DESCRIPTION OF DRAWINGS

FIG. 1 is a flow chart representing an exemplary method of manufacturing a quantum dot composition in accordance with an embodiment of the present disclosure.

FIG. 4 is a flow chart representing an exemplary method of manufacturing a known quantum dot composition for manufacturing a quantum dot composition for manufacturing a light-emitting element.

4

DESCRIPTION OF EMBODIMENTS

Figure 2:
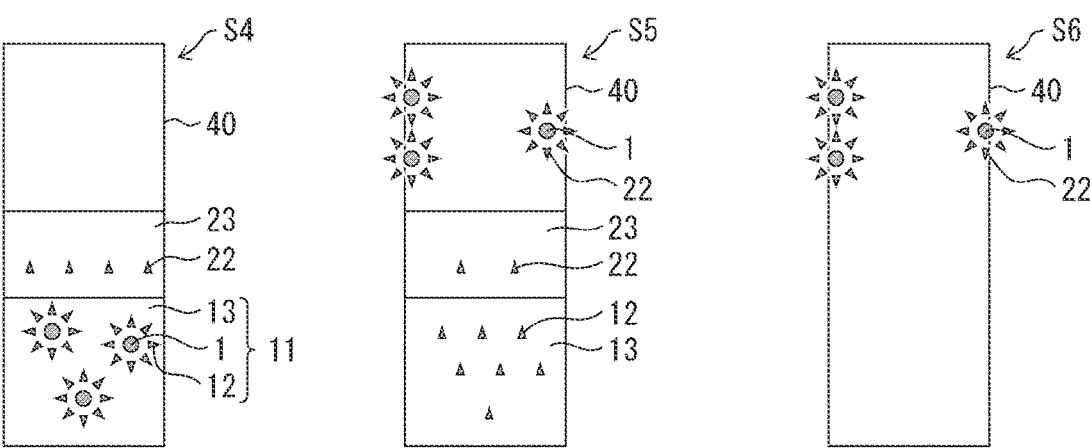
FIG. 2 is cross-sectional views illustrating steps S4 to S6 shown in FIG. 1.

The following will describe an embodiment of the present disclosure in detail. Note that throughout the following description, the expression, "A to B," related to two numbers A and B, refers to a numerical range of from A to B, both inclusive, unless otherwise explicitly mentioned.

Method of Replacing Ligands and Method of Manufacturing Quantum Dot Composition

The present embodiment relates to a method of replacing ligands for manufacture of a quantum dot composition containing no excess ligands and also to a method of manufacturing a quantum dot composition. The present embodiment enables the manufacture of a quantum dot composition containing no excess ligands by using the method of replacing ligands described below.

Quantum dots are abbreviated as "QDs" throughout the following description. In addition, the ligands (starting ligands) that are to be replaced will be referred to as "original ligands," and the eventually substituted ligands will be referred to as "target ligands." Those ligands that are temporarily substituted for the purpose of replacing the original ligands with the target ligands will be referred to as "intermediate ligands." The ligands for dissolving QDs in an organic solvent will be referred to as the "organic-solvent-dissolution ligands," and the ligands for dissolving QDs in a water solvent (water) will be referred to as the "water-solvent-dissolution ligands."

The following will describe an example where: the original ligands are organic-solvent-dissolution ligands that are coordinated to the surface of QDs in synthesizing the QDs (surface modification); and the original ligands are replaced by any suitable organic-solvent-dissolution, target ligands. The original ligands may be organic-solvent-dissolution ligands that are coordinated to the surface of commercially available QDs procured on the market (surface modification).

Accordingly, throughout the following description, the organic solvent used for replacing the original ligands with the intermediate ligands will be referred to as the "intermediate-ligand-substituting solvent," and the organic solvent used for replacing the water-solvent-dissolution ligands with the organic-solvent-dissolution, target ligands will referred to as the "target-ligand-substituting solvent." In addition, the organic solvent that is contained in the QD composition obtained by a QD synthesis step or in a commercially available QD composition and that is subsequently to be replaced will be referred to as the "original solvent," and the organic solvent in which QDs are eventually dissolved will be referred to as the "target solvent."

In the present disclosure, dissolving QDs in an organic solvent or a water solvent means dispersing QDs in an organic solvent or a water solvent until a colloid is obtained.

FIG. 1 is a flow chart representing an exemplary method of manufacturing a QD composition in accordance with the present embodiment.

Referring to FIG. 1, in the method of manufacturing a QD composition in accordance with the present embodiment, the original ligands are preprocessed so that the original ligands can be replaced by target ligands, where necessary. To replace the organic-solvent-dissolution, original ligands coordinated to QDs with organic-solvent-dissolution, target ligands as described earlier, these original ligands need to be replaced by water-solvent-dissolution, intermediate ligands to dissolve the QDs in a water solvent as a preprocess. In addition, the original QD composition obtained by a QD synthesis step contains unreacted starting materials as well as the original solvent and the QDs to which the original ligands are coordinated.

Accordingly, in the present embodiment, as a preprocess, first, the QDs to which the original ligands (third ligands) are coordinated are separated out and dissolved in an intermediate-ligand-substituting solvent. Hence, as indicated by step S1 in FIG. 1, the original solvent in the original QD composition is replaced by an intermediate-ligand-substituting solvent (third organic solvent) (step S1; solvent exchange step to an intermediate-ligand-substituting solvent).

In step S1, first, a poor solvent is added to the original QD composition in a reaction vessel, to deposit the QDs to which the original ligands (third ligands) are coordinated as a solid content (solid). Next, the deposited solid content is precipitated by centrifugation. The solid content is separated out by removing a supernatant liquid including: the original solvent containing unreacted starting materials; and the poor solvent. An intermediate-ligand-substituting solvent is then added as a good solvent to this separated solid content. An intermediate-ligand-substituting QD composition is hence manufactured (prepared) that includes the original ligands, the QDs, and the intermediate-ligand-substituting solvent and in which the QDs to which the original ligands are coordinated are dissolved in the intermediate-ligand-substituting solvent.

Next, the intermediate-ligand-substituting QD composition and the water solvent in which the intermediate ligands (first ligands) are dissolved are mixed in a reaction vessel. Hence, as indicated by step S2 in FIG. 1, the original ligands (third ligands) coordinated to the QDs dissolved in the intermediate-ligand-substituting solvent (third organic solvent) are replaced by the intermediate ligands (first ligands) (step S2; first-ligand-substituting step).

The intermediate ligands here have a concentration of preferably 0.1 mol/L or higher, and more preferably 0.3 mol/L or higher, in the water solvent. Note that the concentration of the intermediate ligands is preferably as high as possible because the intermediate ligands with a higher concentration can more easily replace the original ligands. Therefore, the maximum concentration of the intermediate ligands may be specified in a suitable manner with a view to the solubility of the intermediate ligands in the water solvent or the manufacturing cost of the intermediate ligands and is not limited in any particular manner.

Note that the reaction conditions such as reaction temperature and reaction time in the ligand exchange reaction are specified in a suitable manner depending on, for example, the type and quantity of the original ligands, the intermediate ligands, and the intermediate-ligand-substituting solvent so that the ligand exchange reaction can be completed. Therefore, the reaction conditions are not limited in any particular manner.

The ligand exchange reaction proceeds further at an elevated reaction temperature. At high reaction temperatures, however, the ligands or QDs used could be degraded or decomposed. Also at high reaction temperatures, the intermediate-ligand-substituting solvent may be completely lost depending on the boiling point of the intermediate-ligand-substituting solvent. Therefore, the reaction temperature, although being variable with the type and quantity of the original ligands, the intermediate ligands, and the intermediate-ligand-substituting solvent, is preferably, for example, 80° C. or lower and more preferably 60° C. or lower in some cases. In addition, the ligand exchange ratio grows with a longer reaction time. The exchange reaction can be substantially completed in a few minutes under favorable conditions. It takes no longer than about 24 hours in most cases until the exchange is completed. Therefore, as an example, as will be described later in detail, the ligand exchange is completed by mixing the intermediate-ligand-substituting QD composition and the water solvent in which the intermediate ligands are dissolved and stirring the mixture at room temperature for 2 hours.

Subsequently, the QDs to which the intermediate ligands are coordinated in the reaction vessel are separated out, and these separated QDs are dissolved in a water solvent as a good solvent. Hence, as indicated by step S3 in FIG. 1, a target-ligand-substituting QD composition is manufactured (prepared) in which the QDs to which intermediate ligands are coordinated are dissolved in a water solvent (step S3; target-ligand-substituting QD composition manufacturing step).

In step S3, first, the intermediate-ligand-substituting solvent and the water solvent in the reaction vessel are phase-separated by centrifugation.

The water solvent in the reaction vessel after the ligand exchange contains: the QDs to which the intermediate ligands are coordinated; and the intermediate ligands, as excess ligands, that have not been coordinated to the QDs and are floating in the water solvent. The QDs to which the intermediate ligands are coordinated and the intermediate ligands as excess ligands are dissolved in the water solvent. In addition, the intermediate-ligand-substituting solvent in the reaction vessel after the ligand exchange contains the original ligands floating in the intermediate-ligand-substituting solvent as a result of the ligand exchange. The original ligands are dissolved in the intermediate-ligand-substituting solvent.

Accordingly, the intermediate-ligand-substituting solvent and the water solvent are separated by removing the intermediate-ligand-substituting solvent. A poor solvent is added to the separated water solvent, to deposit the QDs to which the intermediate ligands are coordinated as a solid content. Thereafter, the deposited solid content is precipitated by further centrifugation. Thereafter, the solid content is separated out by removing the supernatant liquid. Thereafter, a water solvent is added anew to this separated solid content, to dissolve the solid content in the water solvent. The target-ligand-substituting QD composition is hence manufactured (prepared) that includes the intermediate ligands, the QDs, and the water solvent and in which the QDs to which the intermediate ligands are coordinated are dissolved in the water solvent.

The procedures so far complete a process of replacing the original ligands with the water-solvent-dissolution, intermediate ligands to dissolve the QDs in the water solvent as a preprocess for such cases where the original ligands are organic-solvent-dissolution ligands. Note that in the present embodiment, as described earlier, since the organic-solvent-dissolution, original ligands coordinated to the QDs are replaced by the organic-solvent-dissolution, target ligands, steps S1 to S3 described above are implemented as a preprocess. However, the preprocess is unnecessary when the original ligands are water-solvent-dissolution ligands, for example, when the purchased QD composition is a QD composition in which QDs are dissolved in a water solvent. When this is the case, the procedures start with step S4 below.

Figure 3:
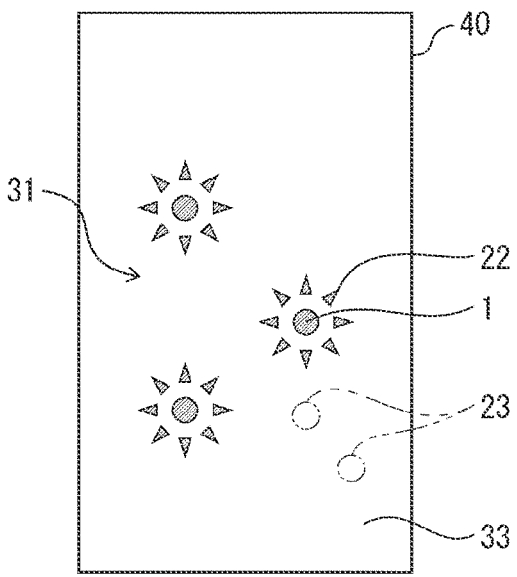
FIG. 3 is a schematic cross-sectional view of a structure of a quantum dot composition for manufacture of a light-emitting element in accordance with an embodiment of the present disclosure.

FIG. 2 is cross-sectional views illustrating steps S4 to S6 shown in FIG. 1. FIG. 3 is a schematic cross-sectional view of a structure of a QD composition for manufacture of a light-emitting element in accordance with the present embodiment.

As indicated by step S4 in FIG. 2, a target-ligand-substituting QD composition 11 (hereinafter, simply a "QD composition 11") obtained in step S3 contains intermediate ligands 12, QDs 1, and a water solvent 13 as the above-described intermediate ligands, QDs, and water solvent. The intermediate ligands 12 are coordinated to the QDs 1 in the QD composition 11.

As indicated by step S4 in FIG. 2, in step S4 (second-ligand-substituting step), the QD composition 11 and a specific target-ligand-substituting solvent 23 (first organic solvent) in which target ligands 22 (second ligands) are dissolved are mixed in a container 40 as a reaction vessel. Hence, as indicated by step S4 in FIG. 1, the intermediate ligands 12 (first ligands) coordinated to the QDs 1 dissolved in the water solvent 13 are replaced by the target ligands 22.

The target-ligand-substituting solvent 23 here is an organic solvent that dissolves the target ligands 22 not coordinated to the QDs 1, but does not dissolve the target ligands 22 coordinated to the QDs 1 (i.e., does not dissolve the QDs 1 to which the target ligands 22 are coordinated).

The target ligands 22 have a concentration of preferably 0.1 mol/L or higher, and more preferably 0.3 mol/L or higher, in the target-ligand-substituting solvent 23. Note that the concentration of the target ligands 22 is preferably as high as possible because the target ligands 22 with a higher concentration can more easily replace the intermediate ligands 12. Therefore, the maximum concentration of the target ligands 22 may be specified in a suitable manner with a view to the solubility of the target ligands 22 in the target-ligand-substituting solvent 23 or the manufacturing cost of the target ligands 22 and is not limited in any particular manner.

Note that the reaction conditions such as reaction temperature and reaction time in the ligand exchange reaction are specified in a suitable manner depending on, for example, the type and quantity of the intermediate ligands 12, the target ligands 22, and the target-ligand-substituting solvent 23 so that the ligand exchange reaction can be completed. Therefore, the reaction conditions are not limited in any particular manner.

In this case, the ligand exchange reaction similarly proceeds further at an elevated reaction temperature. At high reaction temperatures, however, the ligands or QDs 1 used could be degraded or decomposed. Also at high reaction temperatures, the target-ligand-substituting solvent 23 may be completely lost depending on the boiling point of the target-ligand-substituting solvent 23. Therefore, the reaction temperature, although variable with the type and quantity of the intermediate ligands 12, the target ligands 22, and the target-ligand-substituting solvent 23, is preferably, for example, 80° C. or lower and more preferably 60° C. or lower in some cases. In addition, the ligand exchange ratio grows with a longer reaction time. The exchange reaction can be substantially completed in a few minutes under favorable conditions. It takes no longer than about 24 hours in most cases until the exchange is completed. Therefore, as an example, as will be described later in detail, the ligand exchange is completed by mixing the target-ligand-substituting QD composition and the target-ligand-substituting solvent in which the target ligands are dissolved and stirring the mixture at room temperature for 2 hours.

Note that the coordination of the target ligands 22 to the QDs 1 can be verified by checking that the QDs 1 to which the target ligands 22 are coordinated do not dissolve in the water solvent 13 and the target-ligand-substituting solvent 23.

The coordination of some types of ligands can be verified, for example, through measurement by Fourier transform infrared spectroscopy (FT-IR) (hereinafter, will be referred to as "FT-IR measurement"). For instance, if the ligands that are to be coordinated to the QDs 1 include a —COOH group or a —PO group as a functional group to be coordinated to the QDs 1, the ligands show slightly different vibrations in FT-IR measurement depending on whether or not the ligands are coordinated, causing a shift in the detected peak. This approach can hence verify the coordination of the target ligands 22 to the QDs 1.

The coordination of the target ligands 22 to the QDs 1 can also be verified by checking that the ligands, which showed a peak before the exchange of ligands, no longer show a peak after the exchange of ligands, which indicates that all the old ligands have been replaced by the substituted ligands.

Additionally, if at least either the intermediate ligands 12 or the target ligands 22 include a functional group that shows a distinct peak other than the functional group coordinated to the QDs 1, it is also possible to verify the coordination through the detected amount thereof. Examples of such a functional group include an ether group, an ester group, and a C=C bond in oleic acid. In particular, if a distinct peak that was present before the exchange of ligands is lost in the exchange of ligand or if a new distinct peak is detected after the exchange of ligands, it is confirmed that the ligands have been exchanged.

To dissolve the QDs 1 in a solvent, a sufficient number of ligands that dissolve in the solvent need to be coordinated to the QDs 1. Therefore, the fact that the solvent in which the QDs 1 can dissolve has changed before and after the ligand exchange step indicates that the ligands have been exchanged.

As described earlier, the intermediate ligands 12 are soluble in the water solvent 13, and the target-ligand-substituting solvent 23 dissolves the target ligands 22 not coordinated to the QDs 1, but does not dissolve the target ligands 22 coordinated to the QDs 1.

Therefore, the intermediate ligands 12 replaced by the target ligands 22 in step S4 dissolve in the water solvent 13, and the excess target ligands 22 not coordinated to the QDs 1 dissolve in the target-ligand-substituting solvent 23. Since the QDs 1 to which the target ligands 22 are coordinated do not dissolve in the target-ligand-substituting solvent 23 and the water solvent 13, these QDs 1 gradually deposit as a solid (solid content) with the progress of the exchange of ligands.

Accordingly, after the exchange of ligands shown in step S4 described above, as indicated by step S5 in FIGS. 1 and 2, the water solvent 13 in which the intermediate ligands 12 are dissolved, the target-ligand-substituting solvent 23 in which the excess target ligands 22 not coordinated to the QDs 1 are dissolved, and the QDs 1 to which the target ligands 22 are coordinated are phase-separated (step S5; phase separation step).

This phase separation may be performed by, for example, either precipitation or centrifugation. By performing the phase separation by precipitation or centrifugation, the water solvent phase composed of the water solvent 13 in which the intermediate ligands 12 are dissolved, the target-ligand-substituting solvent phase composed of the target-ligand-substituting solvent 23 in which the excess target ligands 22 not coordinated to the QDs 1 are dissolved, and the solid phase composed of the QDs 1 to which the target ligands 22 are coordinated can be readily phase-separated. Note that as described above, since the QDs 1 to which the target ligands 22 are coordinated do not dissolve in the target-ligand-substituting solvent 23 and the water solvent 13, these QDs 1 deposit as a solid (solid content) in the exchange of ligands. Therefore, this phase separation by precipitation or centrifugation may be termed as layer separation.

To obtain a target QD composition, the QDs 1 to which the target ligands 22 are coordinated need to be isolated, and these isolated QDs 1 need to be dissolved in a target solvent as a good solvent.

Accordingly, next, as indicated by step S6 in FIGS. 1 and 2, the intermediate ligands 12 and the target ligands 22 not coordinated to the QDs 1 in the container 40 are removed together with the water solvent 13 and the target-ligand-substituting solvent 23. The QDs 1 to which the target ligands 22 are coordinated are hence isolated (step S6; isolation step).

As described above, the intermediate ligands 12 dissolve in the water solvent 13, and the target ligands 22 dissolve in the target-ligand-substituting solvent 23. Therefore, in the present embodiment, the intermediate ligands 12 and the excess target ligands 22 not coordinated to the QDs 1 can be readily removed by simply removing the water solvent 13 and the target-ligand-substituting solvent 23. Therefore, the present embodiment can isolate the QDs 1 to which the target ligands 22 are coordinated, without having to repeat a purification process as in known technology.

For instance, if the phase separation is performed by centrifugation, as indicated by step S5 in FIG. 2, the QDs 1 to which the target ligands 22 are coordinated adhere to the inner wall of the container such as the centrifugation tube. Meanwhile, as described above, the unnecessary target ligands 22 as excess ligands not coordinated to the QDs 1 are dissolved in the target-ligand-substituting solvent 23 in this container. In addition, the intermediate ligands that are no longer necessary as a result of the exchange of ligands are dissolved in the water solvent 13 in the container. Therefore, if the phase separation is performed by centrifugation, as indicated by step S6 in FIG. 2, the QDs 1 to which the target ligands 22 are coordinated can be readily isolated by simply removing the liquid in the container from the container.

Note that as indicated by step S5 and step S6 in FIG. 2, the container 40 as a reaction vessel may be a container for centrifugation (centrifugation container) such as a centrifugation tube. FIG. 2 shows, as an example, the single container 40 acting as both the reaction vessel used in a ligand exchange reaction and a centrifugation container. Alternatively, the reaction vessel and the centrifugation container may be provided as different containers.

Subsequently, as shown in FIGS. 1 and 3, the QDs 1 to which the target ligands 22 are coordinated, isolated in step S6, are dissolved in a target solvent 33 (second organic solvent). Hence, a target QD composition 31, for manufacture of a light-emitting element, containing no excess ligands can be manufactured (step S7; QD composition manufacturing step for manufacture of a light-emitting element).

As indicated by step S6 in FIG. 2, the solid content remaining in the container 40 is the QDs 1 to which the target ligands 22 are coordinated, and the unnecessary ligands not coordinated to the QDs 1 are removed by removing the aforementioned liquid. Therefore, after the liquid is removed, the container 40 contains no unnecessary ligands that are not coordinated to the QDs 1.

Therefore, as shown in FIGS. 1 and 3, by simply dissolving, in the target solvent 33, the QDs 1 to which the target ligands 22 are coordinated and that was isolated in step S6, the QD composition 31 can be prepared that exhibits an excellent purification efficiency and contains no excess ligands.

Note that if the phase separation is performed by, for example, centrifugation as described above, the solid content adhering to the inner wall of the container 40 (the QDs 1 to which the target ligands 22 are coordinated) can be dissolved in the target solvent 33 by pouring the target solvent 33 over the solid content to elute the solid content. Since this solid content contains no excess ligands, according to the present embodiment, the QD composition 31 containing no excess ligands that are not coordinated to the quantum dots QDs 1 can be obtained by simply eluting the solid content adhering to the inner wall of the container 40.

Note that in the present embodiment, as described above, the purification step can be omitted. Therefore, for example, if the solid content is dissolved in the target solvent 33 without the liquid being completely removed, for example, when the target-ligand-substituting solvent 23 is adhering to the inner wall of the container 40, the QD composition 31 may contain the target-ligand-substituting solvent 23 remaining in the container 40 as indicated by dash-double-dot lines in FIG. 3. However, even in such cases, the target-ligand-substituting solvent 23 remaining in the container 40, for example, adhering to the inner wall of the container 40 is in a very small quantity, and there are no excess ligands at all, or a very small quantity of ligands if any, contained therein.

The excess ligands unnecessary for coordination are dissolved in the target-ligand-substituting solvent 23 in the supernatant liquid in the same the container 40. Therefore, if the solvent in the container 40 is not completely removed, the QD composition 31 obtained by the aforementioned method may contain the target-ligand-substituting solvent 23 in a small amount, but contains no excess ligands.

The QDs 1 used in the present embodiment are not limited in any particular manner and may be of any publicly known QDs. The QDs 1 may contain a semiconductor material composed of at least one element selected from the group consisting of, for example, Cd (cadmium), S (sulfur), Te (tellurium), Se (selenium), Zn (zinc), In (indium), N (nitrogen), P (phosphorus), As (arsenic), Sb (antimony), Al (aluminum), Ga (gallium), Pb (lead), Si (silicon), Ge (germanium), and Mg (magnesium). In addition, the QDs 1 may be core-shell QDs that include a core and a shell. The QDs 1 have a particle diameter that may not be limited in any particular manner.

In addition, the original ligands and the original solvent are not limited in any particular manner. The original solvent may be either polar or non-polar.

The intermediate ligands 12 (first ligands) are used for the purpose of replacing the organic-solvent-dispersion, original ligands with the organic-solvent-dispersion, target ligands 22. The intermediate ligands 12 are water-solvent-dispersion ligands soluble in the water solvent 13. Note that the intermediate ligands 12 are not limited in any particular manner so long as the intermediate ligands 12 are soluble in the water solvent 13. The intermediate ligands 12 are, for example, a compound that contains functional groups to be coordinated to the QDs 1, that can be separated into quaternary ammonium ions and chloride ions, and that contains 6 or fewer carbon atoms per molecule.

The intermediate ligands 12 may be, for example, at least one compound selected from 2-aminoethanethiol hydrochloride, 2-methane aminoethanethiol hydrochloride, 2-ethane aminoethanethiol hydrochloride, 2-dimethylaminoethanethiol hydrochloride, 2-methylethylaminoethanethiol hydrochloride, and 2-diethylaminoethanethiol hydrochloride. Among these compounds, 2-diethylaminoethanethiol hydrochloride is preferable because 2-diethylaminoethanethiol hydrochloride is easily available and forms typical ligands commonly used in dissolving the QDs 1 in a water solvent.

The target ligands 22 (second ligands) are to be substituted and coordinated to the QDs and eventually incorporated into the QD layer of the electroluminescent element in the form of ligands coordinated to QDs. The target ligands 22 are, as described above, organic-solvent-dispersion ligands that do not dissolve in the water solvent 13 and that dissolve in different solvents depending on whether or not the target ligands 22 are coordinated to the QDs 1.

Specifically, the target ligands 22 dissolve singly in the target-ligand-substituting solvent 23 and the target solvent 33 and allow the QDs 1 to which the target ligands 22 are coordinated to dissolve in the target solvent 33, but not in the target-ligand-substituting solvent 23.

An example of such target ligands 22 is at least one compound selected from the group consisting of alkyl-based linear thiol and alkyl-based linear amine.

Note that the backbone of each target ligand 22 preferably contains 5 to 19 carbon atoms. When the backbone of each target ligand 22 contains less than 5 carbon atoms, the material has a lower boiling point, approaching to a gaseous state at room temperature. When this is the case, the material may have insufficient thermal stability if the QDs 1 are required to have thermal resistance to 100° C. and higher temperatures. In addition, since the target ligands 22 are present as an insulator, the target ligands 22 are preferably short. A long-chain ligand with 20 or more carbon atoms may inhibit carrier injection, possibly leading to reduced luminous efficiency. Therefore, the target ligand 22 is selected that has a backbone with 5 to 19 carbon atoms, so that the QDs 1 exhibit high thermal stability and do not reduce luminous efficiency even if the QDs 1 are required to have high thermal resistance.

Examples of alkyl-based linear fatty acids with 5 to 19 carbon atoms include oleic acid, nonanoic acid, mystiric acid, and pentanoic acid. Examples of alkyl-based linear thiols with 5 to 19 carbon atoms include dodecane thiol and hexadecane thiol. Examples of alkyl-based linear amines with 5 to 19 carbon atoms include octyl amine. These compounds have a backbone with 5 to 19 carbon atoms, and the resultant QDs 1 exhibit high thermal stability and do not reduce luminous efficiency even when the QDs 1 are required to have high thermal resistance.

Accordingly, the target ligand 22 is preferably, for example, at least one type of ligand selected from the group consisting of oleic acid, nonanoic acid, mystiric acid, pentanoic acid, dodecane thiol, hexadecane thiol, and octyl amine.

The target-ligand-substituting solvent 23 (first organic solvent) is, as described above, an organic solvent used to replace the water-solvent-dispersion ligands (intermediate ligands 12) with the organic-solvent-dispersion target ligands 22. The target-ligand-substituting solvent 23 is an organic solvent that dissolves the target ligands 22 not coordinated to the QDs 1 and that does not dissolve the target ligands 22 coordinated to the QDs 1 (i.e., that does not dissolve the QDs 1 to which the target ligands 22 are coordinated).

Note that in the present embodiment, a material "not dissolving" in a solvent means that 80% or more of the material precipitates in the solvent.

The target-ligand-substituting solvent 23 is not limited in any particular manner so long as the target-ligand-substituting solvent 23 is an organic solvent that dissolves the target ligands 22 not coordinated to the QDs 1 and that does not dissolve the target ligands 22 coordinated to the QDs 1.

The target-ligand-substituting solvent 23 preferably has a dielectric constant ($\varepsilon_r$) of from 6.02 exclusive to 46.7 inclusive as measured at a temperature around 20° C. to 25° C. Solvents that satisfy $6.02 < \varepsilon_r \leq 46.7$ are highly polar and are poor solvents to the QDs 1 to which the target ligands 22 are coordinated, as shown in, for example, Table 1. The solvent that satisfies $6.02 < \varepsilon_r \leq 46.7$ can precipitate 80% or more of the QDs 1 to which the target ligands 22 are coordinated, after the intermediate ligands 12 are replaced by the target ligands 22.

Table 1 shows the dielectric constants ($\varepsilon_r$) of primary solvents together with the Rohrschneider's polarity parameter (P') thereof. Note that the typically disclosed permittivity and dielectric constant values may be used straightly as the permittivity and dielectric constant here because the typically disclosed permittivity and dielectric constant values are measured at a temperature around 20° C. to 25° C. Note that the permittivity and dielectric constant may be measured by any method using any instrument. As an example, a liquid permittivity meter may be used.

TABLE 1

| Solvent | $\varepsilon_r$ | P' |
|---|---|---|
| water | 78.54 | 10.2 |
| dimethyl sulfoxide | 46.7 | 7.2 |
| ethylene glycol | 37.7 | 6.9 |
| acetonitrile | 37.5 | 5.8 |
| N,N-dimethyl formamide | 36.7 | 6.4 |
| methanol | 32.7 | 5.1 |
| propylene glycol | 32.0 | |
| 2-ethoxy ethanol | 29.6 | |
| ethanol | 24.6 | 4.3 |
| acetaldehyde | 21.1 | |
| acetone | 20.7 | 5.1 |
| n-propyl alcohol | 20.3 | |
| isopropyl alcohol | 19.9 | |
| isobutyl alcohol | 17.93 | |
| 1-butanol | 17.5 | |
| acetophenone | 17.4 | |
| 2-methoxy ethanol | 16.93 | |
| ethylene glycol monomethyl ether | 16.9 | |
| 2-butanol | 16.56 | |
| isopentyl alcohol | 15.19 | |
| cyclohexanol | 15.0 | |
| 1,2-dichloroethane | 10.42 | |
| dichloromethane | 9.08 | |
| dichloromethane | 8.93 | |
| tetrahydrofuran | 7.6 | 4.0 |
| methyl benzoate | 6.63 | |
| dimethyl ether | 6.18 | |
| ethyl acetate | 6.02 | 4.4 |
| ethyl benzoate | 6.02 | |
| chlorobenzene | 5.62 | |
| isobutyl acetate | 5.29 | |
| butyl acetate | 5.01 | |
| chloroform | 4.9 | 4.1 |
| benzyl benzoate | 4.9 | |
| diethyl ether | 4.34 | |
| toluene | 2.38 | 2.4 |
| benzene | 2.28 | |
| p-xylene | 2.27 | |
| carbon tetrachloride | 2.24 | |

TABLE 1-continued

| Solvent | $\varepsilon_r$ | P' |
|---------|------|------|
| cyclohexane | 2.02 | −0.2 |
| n-octane | 1.948 | |
| isooctane | 1.940 | |
| n-heptane | 1.92 | |
| n-hexane | 1.89 | 0.1 |
| n-pentane | 1.84 | |

As shown in Table 1, examples of the organic solvent that satisfies $6.02 < \varepsilon_r \leq 46.7$ include dimethyl sulfoxide, ethylene glycol, acetonitrile, N,N-dimethyl formamide, methanol, propylene glycol, 2-ethoxy ethanol, ethanol, acetaldehyde, acetone, n-propyl alcohol, isopropyl alcohol, isobutyl alcohol, 1-butanol, 2-methoxy ethanol, ethylene glycol monomethyl ether, 2-butanol, isopentyl alcohol, cyclohexanol, 1,2-dichloroethane, dichloromethane, tetrahydrofuran, methyl benzoate, and dimethyl ether. Another example of the organic solvent that satisfies $6.02 < \varepsilon_r 46.7$, although not included in Table 1, is propylene glycol monomethyl ether acetate (PGMEA). PGMEA has an $\varepsilon_r$ approximately equal to that of ethanol (an $\varepsilon_r$ near that of ethanol). PGMEA also has a P' approximately equal to that of ethanol (a P' near that of ethanol).

Among these organic solvents, preferred as the target-ligand-substituting solvent 23 is at least one solvent selected from the group consisting of dimethyl sulfoxide, acetonitrile, N,N-dimethyl formamide, methanol, ethanol, PGMEA, acetone, and isopropyl alcohol. These solvents are preferred because the solvents can precipitate 80% or more of the QDs 1 to which the target ligands 22 are coordinated, easily available, and easy to handle.

In addition, the target-ligand-substituting solvent 23 preferably has a Hildebrand solubility parameter (S) of from 9.3 exclusive to 12.9 inclusive. Solvent that satisfy $9.3 < \delta \leq 12.9$ are highly polar and are poor solvents to the QDs 1 to which the target ligands 22 are coordinated, as shown in, for example, Table 2. The solvent that satisfies $9.3 < \delta \leq 12.9$ can precipitate 80% or more of the QDs 1 to which the target ligands 22 are coordinated after the intermediate ligands 12 are replaced by the target ligands 22.

Table 2 shows the Hildebrand solubility parameters ($\delta$) of primary solvents together with the Rohrschneider's polarity parameters (P') thereof.

TABLE 2

| Solvent | $\delta$ | P' |
|---------|------|------|
| water | 21.0 | 10.2 |
| ethylene glycol | 14.7 | 6.9 |
| methanol | 14.5 | |
| methanol | 12.9 | 5.1 |
| dimethyl sulfoxide | 12.8 | 7.2 |
| ethanol | 12.7 | |
| acetic acid | 12.4 | 6.0 |
| N,N-dimethyl formamide | 12.1 | |
| n-propyl alcohol | 11.97 | |
| acetonitrile | 11.9 | |
| acetonitrile | 11.8 | 5.8 |
| N,N-dimethyl formamide | 11.5 | 6.4 |
| isopropyl alcohol | 11.5 | |
| n-butanol | 11.4 | |
| ethanol | 11.2 | 4.3 |
| Isopropyl alcohol | 10.2 | 3.9 |
| acetone | 9.9 | |
| dioxane | 9.8 | 4.8 |
| ethylene dichloride | 9.7 | 3.5 |
| methyl chloride | 9.7 | |
| methylene chloride | 9.6 | 3.1 |

TABLE 2-continued

| Solvent | $\delta$ | P' |
|---------|------|------|
| chlorobenzene | 9.5 | |
| acetone | 9.4 | 5.1 |
| chloroform | 9.3 | 4.1 |
| methylethyl ketone | 9.3 | |
| ethyl acetate | 9.1 | |
| tetrahydrofuran | 9.1 | 4.0 |
| toluene | 8.9 | 2.4 |
| isopropyl alcohol | 8.8 | |
| ethyl acetate | 8.6 | 4.4 |
| carbon tetrachloride | 8.6 | 1.6 |
| cyclohexane | 8.2 | −0.2 |
| n-octane | 7.5 | |
| n-hexane | 7.3 | 0.1 |
| isopropyl ether | 7.0 | 2.4 |

As shown in Table 2, examples of the organic solvent that satisfies $9.3 < \delta \leq 12.9$ include ethylene glycol, methanol, dimethyl sulfoxide, acetic acid, N,N-dimethyl formamide, n-propyl alcohol, acetonitrile, n-butanol, ethanol, isopropyl alcohol, acetone, dioxane, ethylene dichloride, methyl chloride, methylene chloride, chlorobenzene, and acetone. Another example of the organic solvent that satisfies $9.3 < \delta \leq 12.9$, although not included in Table 2, is PGMEA. PGMEA has a $\delta$ approximately equal to that of ethanol (a $\delta$ near that of ethanol).

Among these organic solvents, preferred as the target-ligand-substituting solvent 23 is at least one solvent selected from the group consisting of dimethyl sulfoxide, acetonitrile, N,N-dimethyl formamide, methanol, ethanol, PGMEA, acetone, and isopropyl alcohol. These solvents are preferred because the solvents can precipitate 80% or more of the QDs 1 to which the target ligands 22 are coordinated, easily available, and easy to handle.

Note that the target-ligand-substituting solvent 23 may be soluble or insoluble in the water solvent 13. However, the target-ligand-substituting solvent 23 and the water solvent 13 can be easily and completely phase-separated in, for example, step S5 by the use of an organic solvent insoluble in the water solvent 13 as the target-ligand-substituting solvent 23. Therefore, the target-ligand-substituting solvent 23 is more preferably an organic solvent insoluble in the water solvent 13.

Therefore, the target-ligand-substituting solvent 23 is preferably at least either one of PGMEA and isopropyl alcohol, which are insoluble in the water solvent 13, among the organic solvents listed as examples above.

Note that unarguably, if there is no need to separate from the water solvent 13, the target-ligand-substituting solvent 23 may be a highly polar solvent soluble in water (water solvent 13), such as dimethyl sulfoxide, acetonitrile, N,N-dimethyl formamide, methanol, ethanol, or acetone.

The target solvent 33 (second organic solvent) is an organic solvent that dissolves the QDs 1 to which the target ligands 22 are coordinated. The target solvent 33 is a non-polar solvent that dissolves the target ligands 22 regardless of whether or not the target ligands 22 are coordinated to the QDs 1.

The target solvent 33 preferably has an $\varepsilon_r$ of from 1.89 to 6.02, both inclusive. Solvents that have an $\varepsilon_r$ of from 1.89 to 6.02, both inclusive, are good solvents to the QDs 1 to which the target ligands 22 are coordinated and can dissolve 50% or more of the QDs 1 to which the target ligands 22 are coordinated.

As shown in Table 1 above, examples of the organic solvent that satisfies $1.89 \leq \varepsilon_r \leq 6.02$ include ethyl acetate, ethyl benzoate, chlorobenzene, isobutyl acetate, butyl acetate (n-butyl acetate), chloroform, benzyl benzoate, diethyl ether, toluene, benzene, p-xylene, carbon tetrachloride, hexanes such as cyclohexane and n-hexane, octanes such as n-octane and isooctane, and heptanes such as n-heptane.

Among these organic solvents, preferred as the target solvent 33 is at least one solvent selected from the group consisting of ethyl acetate, chloroform, toluene, octane, and hexane. Especially preferred among these organic solvents is at least one solvent selected from the group consisting of toluene, octane, and hexane. These solvents are preferred because the solvents are easily available and dissolve the QDs 1 to which the target ligands 22 are coordinated with a particularly high solubility.

The target solvent 33 preferably has a $\delta$ of from 7.3 to 9.3, both inclusive. Solvents that have a $\delta$ of from 7.3 to 9.3, both inclusive, are good solvents to the QDs 1 to which the target ligands 22 are coordinated and can dissolve 50% or more of the QDs 1 to which the target ligands 22 are coordinated.

As shown in Table 2 above, examples of the organic solvent that satisfies $7.3 \le \delta \le 9.3$ include, as shown in Table 2 above, chloroform, methylethyl ketone, tetrahydrofuran, toluene, isopropyl alcohol, ethyl acetate, carbon tetrachloride, cyclohexane, hexanes such as n-hexane, and octanes such as n-octane.

Among these organic solvents, preferred as the target solvent 33 is at least one solvent selected from the group consisting of ethyl acetate, chloroform, toluene, octane, and hexane. Especially preferred is at least one solvent selected from the group consisting of toluene, octane, and hexane. These solvents are preferred because the solvents are easily available and dissolve the QDs 1 to which the target ligands 22 are coordinated with a particularly high solubility.

Among the above-described organic solvents, more preferably used as the target solvent 33 is at least either one of toluene and hexane. Especially preferably used among the organic solvents is at least toluene. These solvents dissolve the QDs 1 to which the target solvent 33 are coordinated with a particularly high solubility.

The intermediate-ligand-substituting solvent is, as described above, an organic solvent used for the purpose of replacing the organic-solvent-dispersion, original ligands with the water-solvent-dispersion ligands (intermediate ligands 12).

The intermediate-ligand-substituting solvent is an organic solvent for the purpose of dissolving the QDs 1 to which the original ligands are coordinated. The intermediate-ligand-substituting solvent that dissolves the intermediate ligands regardless of whether or not the intermediate ligands are coordinated to the QDs 1.

The intermediate-ligand-substituting solvent may be an organic solvent similar to the target solvent 33. The intermediate-ligand-substituting solvent preferably has, similarly to the target solvent 33, an $\varepsilon_r$ of from 1.89 to 6.02, both inclusive, or an $\varepsilon$ of from 7.3 to 9.3, both inclusive.

The target-ligand-substituting solvent 23 and this intermediate-ligand-substituting solvent may be soluble or insoluble in the water solvent 13. It should be understood that the intermediate-ligand-substituting solvent and the water solvent 13 can be easily and completely phase-separated in, for example, step S3 by the use of an organic solvent insoluble in the water solvent 13 as the intermediate-ligand-substituting solvent. Therefore, the intermediate-ligand-substituting solvent is more preferably an organic solvent insoluble in the water solvent 13.

Therefore, the intermediate-ligand-substituting solvent is preferably at least one solvent selected from the group consisting of chloroform, toluene, hexane, and octane. Among these solvents, at least either one of toluene and hexane is more preferably used. Especially preferably used among the solvents is at least toluene. These solvents do not dissolve in water and are also easily available.

In addition, in the present embodiment, the substance for the container 40 used in ligand exchange is not limited in any particular manner. Examples of the substance include polypropylene (PP), polytetrafluoroethylene (PTFE), glass, and metal.

In known ligand exchange, as described above, a non-polar solvent such as toluene is used as an organic solvent 43. PP is usually not used because PP has low resistance to non-polar solvents such as toluene, requires an extended period of time in ligand exchange and washing, and causes excess ligands to deposit. However, PP has sufficient resistance to the target-ligand-substituting solvent 23 in accordance with the present embodiment. In addition, even if the container 40 used in ligand exchange is used as is as a centrifugation container in the isolation step (step S6), and the solid content adhering to the inner wall of the container 40 is eluted by pouring the target solvent 33 over the solid content, the period of time during which the container 40 is in contact with the target solvent 33 is far shorter than the time taken in ligand exchange and washing. Therefore, the container 40 used in ligand exchange may be used as is in steps S6 and S7. Note that unarguably, the container may be replaced after the ligand exchange in step S5.

As described here, the present embodiment enables the use of PP, which could not be used, as at least the inner wall of the container 40. PP can be preferably used as the substance for the inner wall of the container 40 because PP is relatively unlikely to react with various organic solvents and also relatively inexpensive.

Additionally, by providing small irregularities on the inner wall of the container 40, PP can be made more likely to deposit than solid contents.

Figure 5:
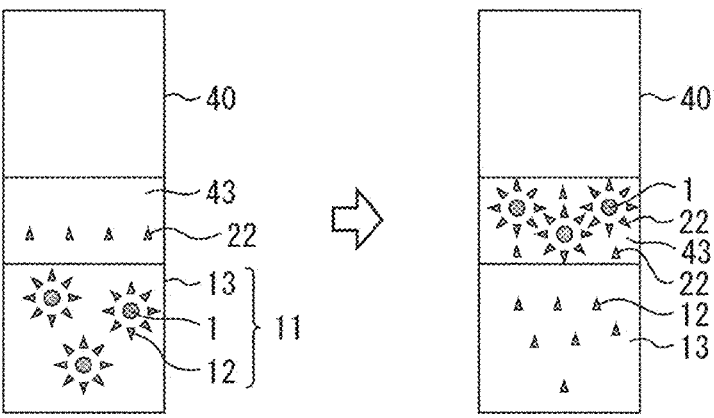
FIG. 5 is a cross-sectional view illustrating step S14 shown in FIG. 4.
Figure 6:
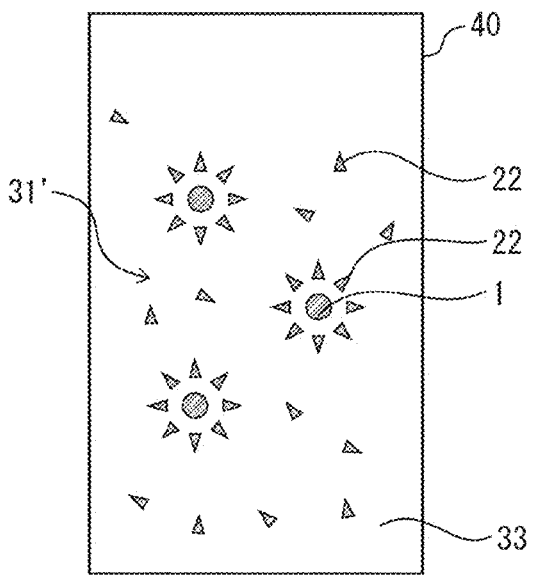
FIG. 6 is a schematic cross-sectional view of a structure of a known quantum dot composition for manufacture of a light-emitting element.

A description is given next of a known method of manufacturing a QD composition for manufacturing a QD composition for manufacturing a light-emitting element for comparison with reference to FIGS. 4 to 6.

FIG. 4 is a flow chart representing an exemplary known method of manufacturing a QD composition for manufacturing a QD composition for manufacturing a light-emitting element. FIG. 5 is a cross-sectional view illustrating a step denoted by step S14 shown in FIG. 4. FIG. 6 is a schematic cross-sectional view of a structure of a QD composition for manufacture of a known light-emitting element.

Note that the following description again takes as an example the replacement of the organic-solvent-dissolution, original ligands coordinated to QDs with the organic-solvent-dissolution, target ligands. Therefore, steps S1 to S3 are the same as in FIG. 1. Therefore, description is omitted about steps S1 to S3. For convenience of description, members that have the same function as members shown in FIG. 2 and figures are indicated by the same reference numerals, and description thereof is omitted.

Conventionally, after step S3, the QD composition 11, which is a target-ligand-substituting QD composition, and the target-ligands-dissolved, organic solvent 43 in which the target ligands 22 are dissolved are mixed in the container 40. The organic solvent 43 is, for example, toluene as described in Patent Literature 1. As described here, the organic solvent 43 is, for example, the same organic solvent as the target solvent 33, composed of a non-polar solvent such as toluene.

Hence, as shown in FIG. 5, the intermediate ligands 12 coordinated to the QDs 1 dissolved in the water solvent 13 are replaced by the target ligands 22 (step S14; second-ligand-substituting step).

After the exchange of ligands, the organic solvent 43 in the container 40 contains: the QDs 1 to which the target ligands 22 are coordinated; and the target ligands 22 as excess ligands floating in the organic solvent 43 without being coordinated to the QDs 1, as shown in FIG. 5. The QDs 1 to which the target ligands 22 are coordinated and the target ligands 22 as excess ligands are dissolved in the organic solvent 43. In addition, after the exchange of ligands, the water solvent 13 in the container 40 contains the intermediate ligands 12 floating in the water solvent 13 as a result of the exchange of ligands. The intermediate ligands 12 are dissolved in the water solvent 13.

Note that FIG. 5 shows an example where toluene is used as the organic solvent 43. The positions of the organic solvent phase and the water solvent phase vary with the specific gravities of the organic solvent 43 and the water solvent 13. For instance, if toluene is used as the organic solvent 43 as shown in FIG. 5, the organic solvent phase forms an upper layer, and the water solvent phase forms a lower layer. However, if an organic solvent that has a larger specific gravity than water (e.g., dichloromethane or chloroform) is used as the organic solvent 43, the water solvent phase forms an upper layer, and the organic solvent phase forms a lower layer.

Accordingly, next, the QDs 1 to which the target ligands 22 are coordinated in the container 40 are separated as a solid content (step S15; separation step). In step S15, if the organic solvent phase sits above the water solvent phase as shown in FIG. 5, for example, first, the organic solvent 43 containing the QDs 1 to which the target ligands 22 are coordinated and the target ligands 22 as excess ligands is taken out of the container 40. Next, the organic solvent 43 thus taken out is put into another container 40, and a poor solvent is added. Note that if the organic solvent phase sits below the water solvent phase, for example, the water solvent layer, which is the upper phase, is removed from the container 40 before a poor solvent is added to the organic solvent 43 in the container 40.

Hence, the QDs 1 dissolved in the organic solvent 43 and to which the target ligands 22 are coordinated are deposited as a solid content. Next, centrifugation is further performed to precipitate the deposited solid content. Thereafter, the precipitate containing the QDs 1 to which the target ligands 22 are coordinated is separated out by removing the organic solvent 43 containing no QDs 1 to which the target ligands 22 are coordinated and also removing the supernatant liquid containing the poor solvent.

However, as described above, after the exchange of ligands, both the QDs 1 to which the target ligands 22 are coordinated and the target ligands 22 as excess ligands are dissolved in the organic solvent 43. Therefore, the target ligands 22 as excess ligands are present in large amounts in the container 40 from which the supernatant liquid has been removed.

Accordingly, next, the organic solvent 43 is again added anew to the container 40, to dissolve, in the organic solvent 43, the QDs 1 to which the target ligands 22 are coordinated and the target ligands 22 as excess ligands remaining in the container 40 (step S16; re-dissolution step).

Next, a poor solvent is added again to the container 40, and the mixture is subjected to centrifugation. Hence, the QDs 1 to which the target ligands 22 are coordinated are precipitated again as a solid content. Thereafter, the precipitate is separated out again (step S17; re-separation step) by removing the supernatant liquid containing the poor solvent and the organic solvent 43 containing excess ligands.

Thereafter, the QDs 1 to which the target ligands 22 are coordinated are washed (purified) by repeating aforementioned steps S16 and S17 a plurality of times.

Next, as shown in FIGS. 4 and 6, the target solvent 33 is added to this solid content separated out by washing a plurality of times, to dissolve the QDs 1 to which the target ligands 22 are coordinated in the target solvent 33. Hence, a QD composition 31' is manufactured for manufacture of a light-emitting element (step S18; QD composition manufacturing step for manufacture of a light-emitting element).

Note that the example shown in FIG. 6 does not show the organic solvent 43 used in ligand exchange because toluene is used as both the organic solvent 43 and the target solvent 33. However, if different solvents are used as the target solvent 33 and the organic solvent 43, the resultant QD composition 31' may in some cases contain the organic solvent 43 even in the example shown in FIG. 6.

Effects

Referring to FIG. 6, known methods fall short of readily and sufficiently removing excess ligands. Even after a plurality of times of washing, the resultant QD composition 31' contains the target ligands 22 not coordinated to the QDs 1 (excess ligands) in large amounts.

These excess ligands have adverse effects on, for example, ease in forming a film in the manufacture of the electroluminescent element and the carrier injection, emission uniformity, and element lifetime of the resultant electroluminescent element.

The aforementioned known method is not only inefficient, but can also damage the QDs 1 in the process of repeatedly removing excess ligands. For instance, the repeated implementation of the washing step may strip away the target ligands 22 coordinated to the QDs 1, thereby possibly leading to adversely affecting the capability and stability of the QDs 1.

Meanwhile, the method of exchanging ligands and the method of manufacturing the QD composition 31 in accordance with the present embodiment include step S4 (second-ligand-substituting step) of mixing the QD composition 11 in which the intermediate ligands 12 and the QDs 1 are dissolved in the water solvent 13 with the target-ligand-substituting solvent 23 in which the target ligands 22 are dissolved, to replace the intermediate ligands 12 with the target ligands 22.

In step S4, the target ligands 22 are substituted using the target-ligand-substituting solvent 23 that satisfies conditions that the target ligands 22 (the target ligands 22 not coordinated to the QDs 1) dissolve singly in the target-ligand-substituting solvent 23 and that the target ligands 22 coordinated to the QDs 1 do not dissolve in the target-ligand-substituting solvent 23.

According to the present embodiment, a target-ligand-substituting solvent 23 as a solvent for a ligand solution used in the substitution of the target ligands 22 is selected so as to satisfy these conditions as described above, so that the QDs 1 after the ligand exchange cannot dissolve in the target-ligand-substituting solvent 23. As a result, the QDs 1 coordinated to the target ligands 22 deposit as a solid after the target ligands 22 are substituted. Since this solid contains only the QDs 1, not excess ligands, the solid is ready to use if the solid is simply dissolved in the target solvent 33.

As described here, according to the present embodiment, excess ligands can be removed simultaneously with ligand exchange. Therefore, unlike the known method, the present embodiment does not need washing.

By dissolving the deposited solid in the target solvent 33, the present embodiment can hence provide the QD composition 31, containing no excess ligands, that achieves an improved purification efficiency over known QD compositions and that restrains damage to the QDs 1 caused by the repeated removal of excess ligands in comparison with known QD compositions. The present embodiment can also provide a method of exchanging ligands that is capable of delivering such a QD composition 31 and a method of manufacturing the QD composition 31.

A more specific description is given next of the method of exchanging ligands and the method of manufacturing a light-emitting element manufacturing QD composition in accordance with the present embodiment by means of examples. It should be understood that the method of exchanging ligands and the method of manufacturing a light-emitting element manufacturing QD composition in accordance with the present embodiment are not limited to the following examples.

Examples

First, 100 μL of a QD composition (original QD composition) containing 20 mg/mL QDs to which dodecane thiol was coordinated as original ligands was dispensed dropwise over octane in a centrifugation tube. Next, 10 mL of ethanol was added as a poor solvent to the QD composition in the centrifugation tube. After the QDs were precipitated, the mixture was further subjected to centrifugation to deposit a solid content. Thereafter, a supernatant liquid (ethanol) was removed, and 1,000 μL of toluene was added as an intermediate-ligand-substituting solvent, to replace the solvent. Hence, a QD solution in which QDs to which dodecane thiol was coordinated were dissolved in toluene was prepared as a QD composition (intermediate-ligand-substituting QD composition).

Next, 300 μL of an aqueous ligand solution containing 200 mg/mL 2-diethylaminoethanethiol hydrochloride as intermediate ligands dissolved in water was added to this QD solution in the centrifugation tube, and the mixture was stirred at room temperature for 2 hours. Hence, dodecane thiol was replaced by 2-diethylaminoethanethiol hydrochloride.

Next, the centrifugation tube was subjected to centrifugation, to phase-separate the toluene in which the dodecane thiol was dissolved and an aqueous QD solution containing QDs to which the 2-diethylaminoethanethiol hydrochloride was coordinated. Thereafter, the toluene in which the dodecane thiol was dissolved and the aqueous QD solution containing QDs to which the 2-diethylaminoethanethiol hydrochloride was coordinated were taken out of the centrifugation tube, and only the aqueous QD solution was transferred to another centrifugation tube. Next, 10 mL of acetone was added as a poor solvent to the aqueous QD solution in the centrifugation tube, to deposit a solid content, and the mixture was further subjected to centrifugation to precipitate the deposited solid content. Thereafter, a supernatant liquid (acetone) was removed, and 1,000 μL of water was added, to replace the solvent. Hence, an aqueous QD solution in which QDs to which 2-diethylaminoethanethiol hydrochloride was coordinated were dissolved in water (water solvent) was prepared as a QD composition (target-ligand-substituting QD composition).

Next, 100 μL of a ligand solution containing 300 mg/mL oleic acid as target ligands dissolved in PGMEA as a target-ligand-substituting solvent was added to this aqueous QD solution in the centrifugation tube, and the mixture was stirred at room temperature for 2 hours. Hence, 2-diethyl-aminoethanethiol hydrochloride was replaced by oleic acid.

Next, the centrifugation tube was subjected to centrifugation, to phase-separate the aqueous 2-diethylaminoeth-anethiol hydrochloride solution (aqueous solution phase), the PGMEA solution (PGMEA phase) in which excess oleic acid not coordinated to the QDs 1 was dissolved, and the QDs to which oleic acid was coordinated.

Figure 7:
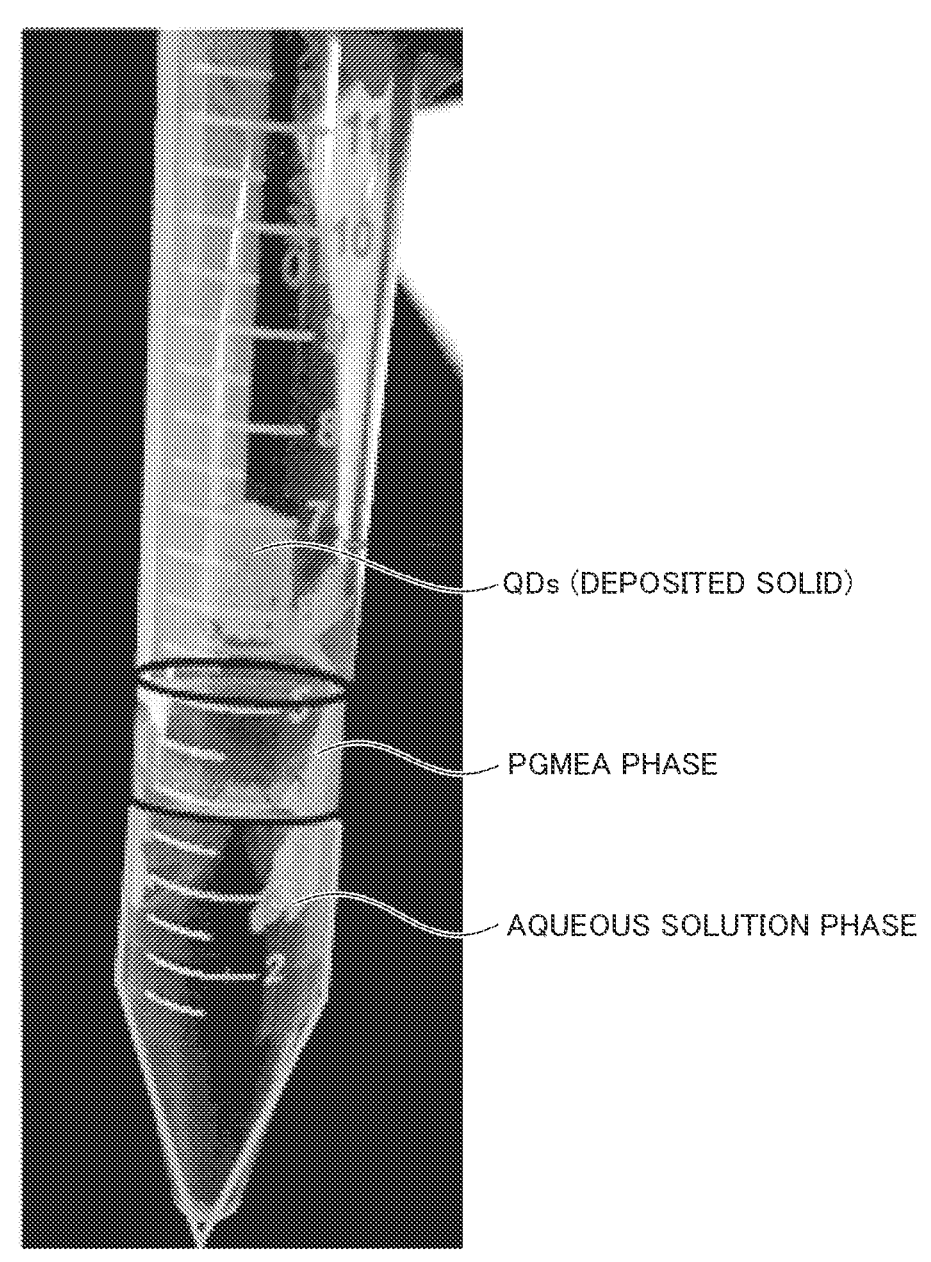
FIG. 7 is a drawing showing a photograph of a centrifugation tube having been subjected to centrifugation after the substitution of target ligands in an example of the present disclosure.

FIG. 7 is a drawing showing a photograph of a centrifugation tube having been subjected to centrifugation after the substitution of the target ligands (oleic acid).

Referring to FIG. 7, it was observed in the present example that after oleic acid was coordinated to the QDs, oleic acid no longer dissolved in PGMEA, which was the original solvent, and also that after the centrifugation, QDs to which oleic acid was coordinated deposited and adhered to the wall face of the centrifugation tube.

After the centrifugation, the QDs adhering to the wall face of the centrifugation tube were exclusively QDs to which ligands were coordinated, and excess ligands unnecessary for coordination were dissolved in the PGMEA in the same centrifugation tube.

Accordingly, the residual liquid on those portions of the centrifugation tube other than the wall face (i.e., the supernatant liquid in the centrifugation tube) was completely removed, and 100 μL of toluene was added as a target solvent, to dissolve the post-ligand exchange QDs adhering to the wall face of the centrifugation tube again in toluene. Hence, a QD composition was manufactured (prepared) that contained 20 mg/mL QDs to which oleic acid was coordinated as target ligands.

As described here, according to the present example, a QD composition, containing no excess ligands, in which QDs to which target ligands are coordinated are dissolved in a target solvent is readily and efficiently obtained by exploiting differences between the solubility of the ligands as such and the solubility of the ligands coordinated to QDs in various solvents.

Table 3 shows the solubility of pure oleic acid, oleic acid coordinated to QDs, and a mixture of oleic acid and oleic acid coordinated to QDs in water, PGMEA, and toluene used in the present example.

TABLE 3

|  | Solubility in water | Solubility in PGMEA | toluene |
|---|---|---|---|
| oleic acid | X | ○ | ○ |
| oleic acid coordinated to QDs | X | X | ○ |
| oleic acid + oleic acid coordinated to QDs | X | oleic acid ○, oleic acid coordinated to QDs X | oleic acid ○, oleic acid coordinated to QDs ○ |

In Table 3, "x" indicates that the material did not dissolve (80% or more of the material precipitated), and "○" indicates that 90 to 100% of the material dissolved.

The results in Table 3 show that oleic acid is an organic-solvent-dissolution ligands and does not dissolve in water. The results also show that PGMEA dissolves oleic acid not coordinated to QDs, but does not dissolve oleic acid coordinated to QDs. It is hence possible to deposit only oleic acid coordinated to QDs from PGMEA containing oleic acid not coordinated to QDs. It is therefore understood that ligands can be exchanged simultaneously with washing and removal of excess ligands, by using PGMEA as the target-ligand-substituting solvent. It is understood that in contrast, toluene dissolves oleic acid regardless of whether or not oleic acid is coordinated to QDs and for this reason, washing is needed after ligands are exchange.

Additionally, relationships between the aforementioned dielectric constant ($\varepsilon_r$), the solubility of pure oleic acid, and the solubility of QDs to which oleic acid was coordinated were examined by changing solvents. Results are shown in FIG. 8.

Additionally, relationships between the solubility parameter ($\delta$), the solubility of pure oleic acid, and the solubility of QDs to which oleic acid was coordinated were examined by changing solvents. Results are shown in FIG. 9.

Figure 8:
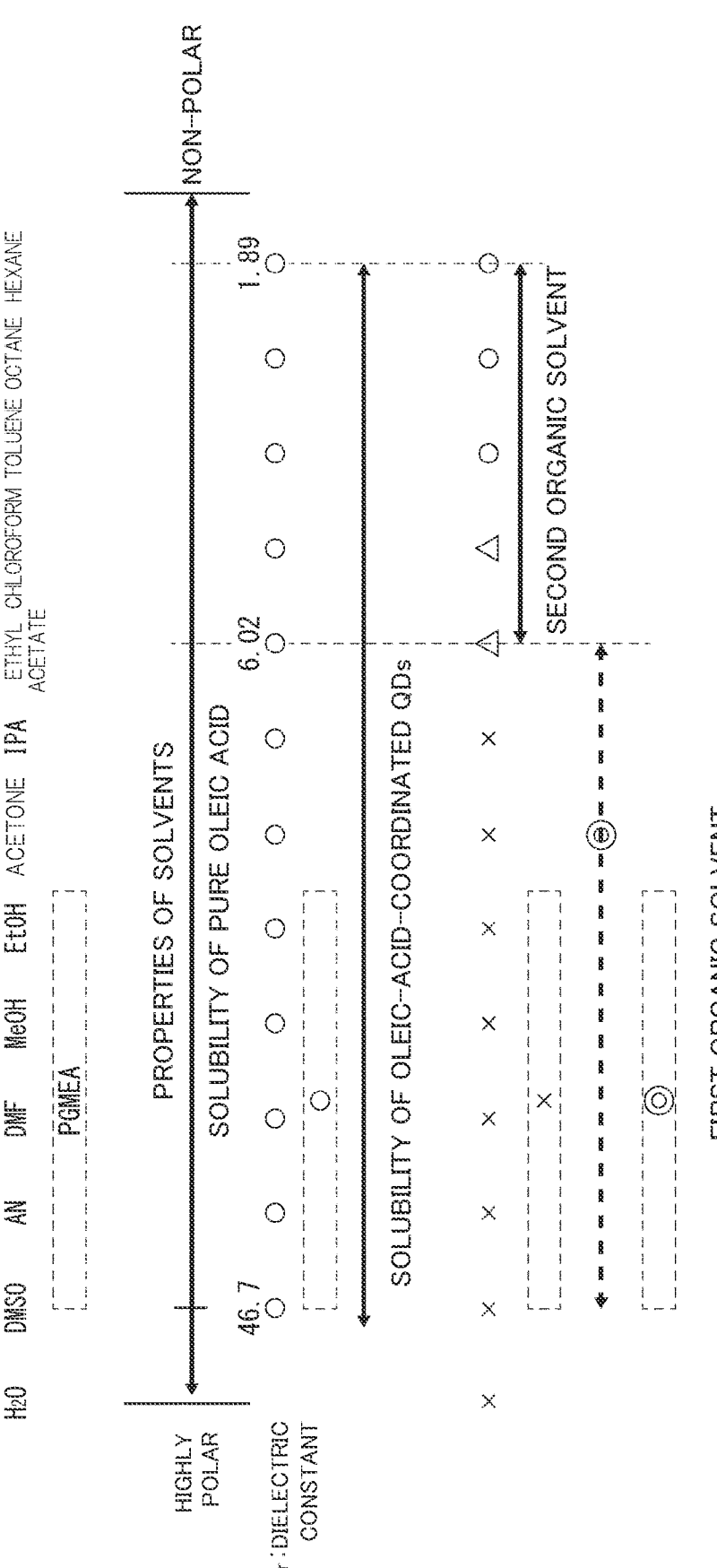
FIG. 8 is a diagram illustrating relationships between the dielectric constants of a target-ligand-substituting solvent and a target solvent, the solubility of pure oleic acid in these target-ligand-substituting solvent and target solvent, and the solubility of quantum dots to which oleic acid has been coordinated, all of which are used in an example of the present disclosure.

FIG. 8 is a diagram illustrating relationships between a target-ligand-substituting solvent (first organic solvent), a target solvent (second organic solvent), the solubility of pure oleic acid (second ligands), and the solubility of QDs to which oleic acid (second ligands) is coordinated. FIG. 9 is a diagram illustrating relationships between a target-ligand-substituting solvent, a target solvent, the solubility of pure oleic acid, and the solubility of QDs to which oleic acid is coordinated.

Figure 9:
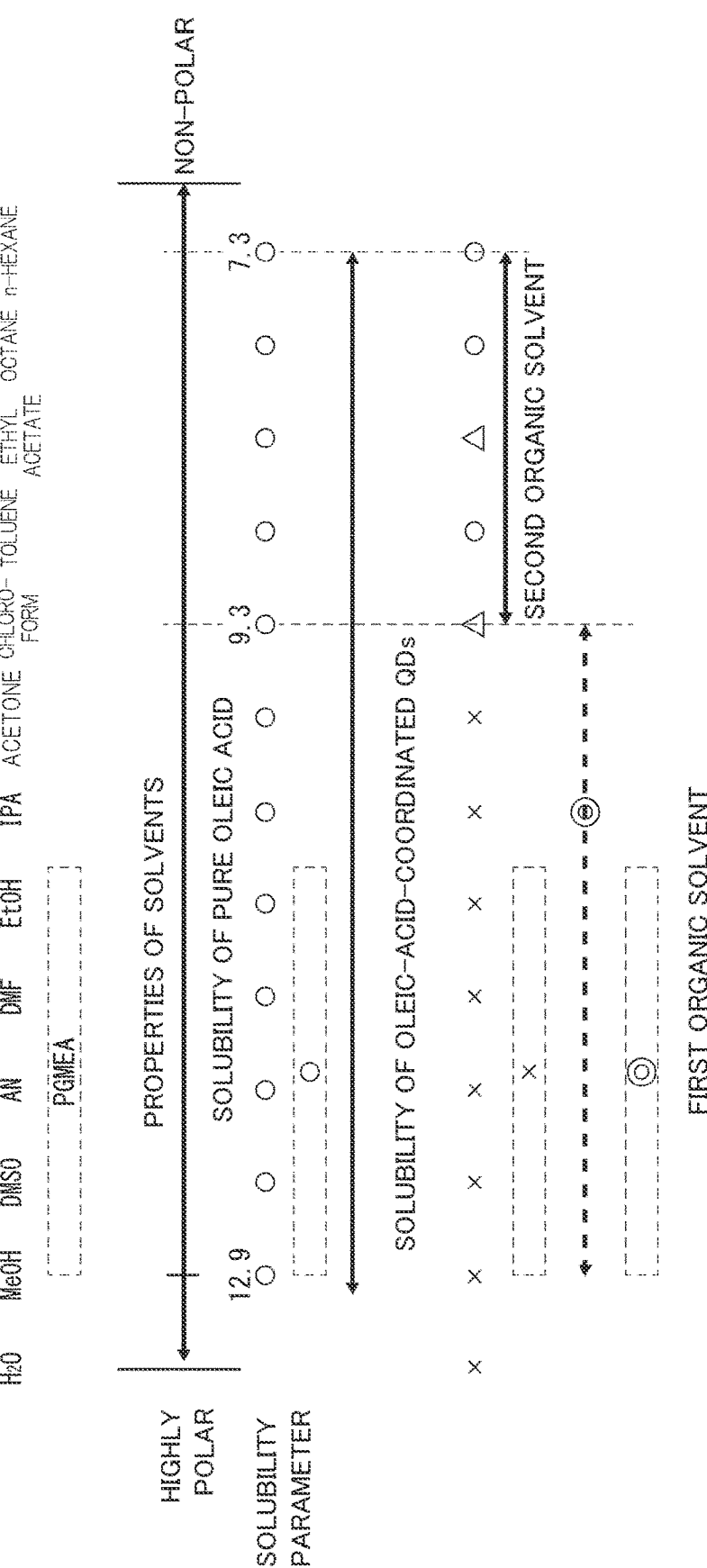
FIG. 9 is a diagram illustrating relationships between the solubility parameters of a target-ligand-substituting solvent and a target solvent, the solubility of pure oleic acid in these target-ligand-substituting solvent and target solvent, and the solubility of quantum dots to which oleic acid has been coordinated, all of which are used in an example of the present disclosure.

In FIGS. 8 and 9, the solvent for which the solubility of pure oleic acid is marked by "O" indicates a solvent in which 80% or more of the pure oleic acid not coordinated to QDs precipitates. Furthermore, in FIGS. 8 and 9, the solvent for which the solubility of QDs to which oleic acid is coordinated is marked by "×" indicates a solvent in which 80% or more of QDs in which ligands are replaced by oleic acid precipitates. In other words, it is indicated that the solvent does not dissolve QDs in which ligands are replaced by oleic acid. Furthermore, in FIGS. 8 and 9, the solvent for which the solubility of QDs to which oleic acid is coordinated is marked by "Δ" indicates a solvent in which 50% inclusive to 90% exclusive of QDs in which ligands are replaced by oleic acid dissolve. In FIGS. 8 and 9, the solvent for which the solubility of QDs to which oleic acid is coordinated is marked by "○" indicates a solvent in which 90 to 100% of QDs in which ligands are replaced by oleic acid dissolve.

In addition, in FIGS. 8 and 9, the symbol "double circle" indicates those solvents used as a target-ligand-substituting solvent (first organic solvent) which dissolve in water.

Note that in FIGS. 8 and 9, "H$_2$O," "DMSO," "AN," "DMF," "MeOH," "EtOH," "PGMEA," and "IPA" represent "water," "dimethyl sulfoxide," "acetonitrile," "N,N-dimethyl formamide," "methanol," "ethanol," "propylene glycol monomethyl ether acetate," and "isopropyl alcohol" respectively.

The results in FIG. 8 show that the organic solvent for which $6.02 < \varepsilon_r \leq 46.7$ can be suitably used as the target-ligand-substituting solvent 23 and that the organic solvent for which $1.89 \leq \varepsilon_r \leq 6.02$ can be suitably used as the target solvent 33.

The results in FIG. 9 show that the organic solvent for which $9.3 < \delta \leq 12.9$ can be suitably used as the target-ligand-substituting solvent 23 and that the organic solvent for which $7.3 \leq \delta \leq 9.3$ can be suitably used as the target solvent 33.

QD Composition

As shown in FIG. 3 above, the QD composition 31 in accordance with the present embodiment contains at least the QDs 1, the target ligands 22, and the target solvent 33.

As described above, if ligands are exchanged by using the target-ligand-substituting solvent 23, the purification step for the post-ligand exchange QDs 1 (i.e., the QDs 1 to which the target ligands 22 are coordinated) can be omitted. Therefore, the QD composition 31 may in some cases contain the target-ligand-substituting solvent 23 as, for example, a miniscule-amount component (impurity) after the isolation of the post-ligand exchange QDs 1 and the solvent exchange through the dissolution of the QDs 1 in the target solvent 33.

Therefore, the QD composition 31 may in some cases contain, as a solvent, the target solvent 33 as a primary component and further contain, as a solvent, the target-ligand-substituting solvent 23, as shown in FIG. 3. However, as described above, the QDs 1 to which the target ligands 22 are coordinated do not dissolve in the target-ligand-substituting solvent 23.

Therefore, the QD composition 31 may contain the target-ligand-substituting solvent 23 as a solvent as described above, but preferably contains the target solvent 33 in as small an amount as possible in the QD composition 31 so as not to disrupt dissolution of the QDs 1 in the target solvent 33. Therefore, when the solvent in the QD composition 31 includes the target-ligand-substituting solvent 23, the proportion of the target-ligand-substituting solvent 23 to the total amount of the target-ligand-substituting solvent 23 and the target solvent 33 is preferably 5 vol % or lower (i.e., from 0 exclusive to 5 vol % inclusive) in volume ratio. Hence, the QD composition 31 can be provided in which the QDs 1 are substantially uniformly dissolved in the target solvent 33.

The QD composition 31 in accordance with the present embodiment enables omitting the purification step, but contains no excess ligands as an impurity, as described above. Note that unarguably, the QD composition 31 containing no target-ligand-substituting solvent 23 can be obtained by completely removing the target-ligand-substituting solvent 23 when the QDs 1 to which the target ligands 22 are coordinated are isolated in aforementioned step S6.

In any case, the present embodiment can provide the QD composition 31, containing no excess ligands not coordinated to the QDs 1 as ligands, that achieves an improved purification efficiency over known QD compositions and that restrains damage to the QDs 1 caused by the repeated removal of excess ligands in comparison with known QD compositions.

Outline of Structure of Electroluminescent Element and Method of Manufacturing Electroluminescent Element The QD composition 31 can be suitably used in a light-emitting element. A description is given below of an example of a light-emitting element using the QD composition 31. A light-emitting element in accordance with the present embodiment is an electroluminescent element including, as a light-emitting layer, a QD light-emitting layer as a QD layer containing the QDs 1 and the target ligands 22.

Figure 10:
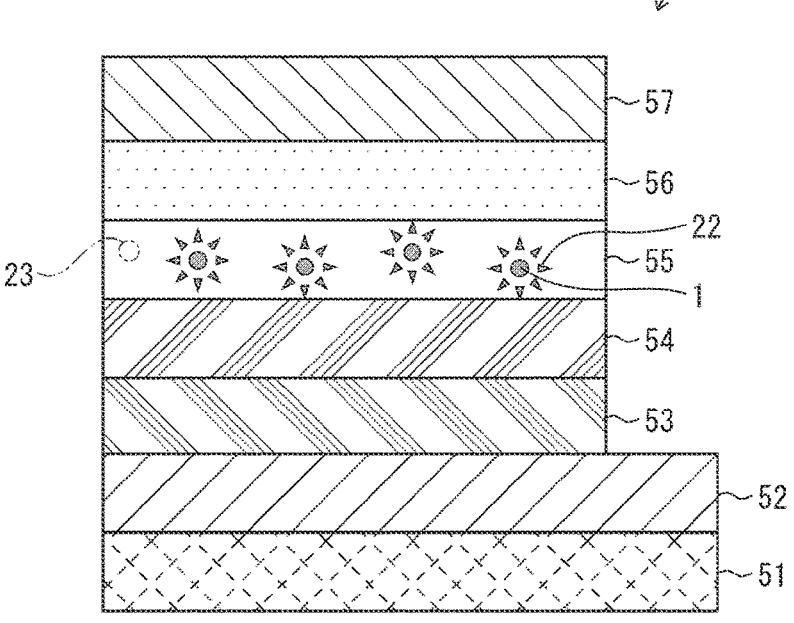
FIG. 10 is a schematic cross-sectional view of an exemplary structure of a light-emitting element in accordance with an embodiment of the present disclosure.

FIG. 10 is a schematic cross-sectional view of an exemplary structure of a light-emitting element in accordance with the present embodiment.

A light-emitting element 50 shown in FIG. 10 is an electroluminescent element that emits light when a voltage is applied to the QD 1. The light-emitting element 50 is, for example, a quantum-dot light-emitting diode (QLED). Note that the light-emitting element 50 may be used, for example, as a light source in, for example, a display device or a lighting device.

The light-emitting element 50 shown in FIG. 10 includes an anode 52 (anode or first electrode), a cathode 57 (cathode or second electrode), and a functional layer provided between the anode 52 and the cathode 57 and containing at least a QD light-emitting layer 55. Note that in the present embodiment, the layers between the anode 52 and the cathode 57 are collectively referred to as a functional layer.

The functional layer may be either a monolayer composed solely of the QD light-emitting layer 55 or a multilayer including the QD light-emitting layer 55 and other functional layers. The functional layers other than the QD light-emitting layer 55 may be, for example, a hole injection layer 53 (HIL), a hole transport layer 54 (HTL), and an electron transport layer 56 (ETL).

Note that each layer from the anode 52 to the cathode 57 is typically formed on a substrate 51 as a support body. Therefore, the light-emitting element 50 may include the substrate 51 as a support body.

The light-emitting element 50 shown in FIG. 10 includes, as an example, the substrate 51, the anode 52, the hole injection layer 53, the hole transport layer 54, the QD light-emitting layer 55, the electron transport layer 56, and the cathode 57, all of which are stacked in this order toward the top end of FIG. 10.

It should be understood that the light-emitting element 50 does not necessarily have this structure and may include the cathode 57, the electron transport layer 56, the QD light-emitting layer 55, the hole transport layer 54, the hole injection layer 53, and the anode 52, all of which are stacked in this order on the substrate 51.

Note that the light-emitting element 50 may include layers other than the hole injection layer 53, the hole transport layer 54, the QD light-emitting layer 55, and the electron transport layer 56 as functional layers. As an example, the light-emitting element 50 may include an electron injection layer between the QD light-emitting layer 55 and the cathode 57. For instance, when the light-emitting element 50 includes the electron transport layer 56 as shown in FIG. 10, the light-emitting element 50 may include an electron injection layer between the electron transport layer 56 and the cathode 57. Furthermore, when the QD light-emitting layer 55 can be supplied with sufficient holes by using only the hole transport layer 54, the hole injection layer 53 may not be provided.

Figure 11:
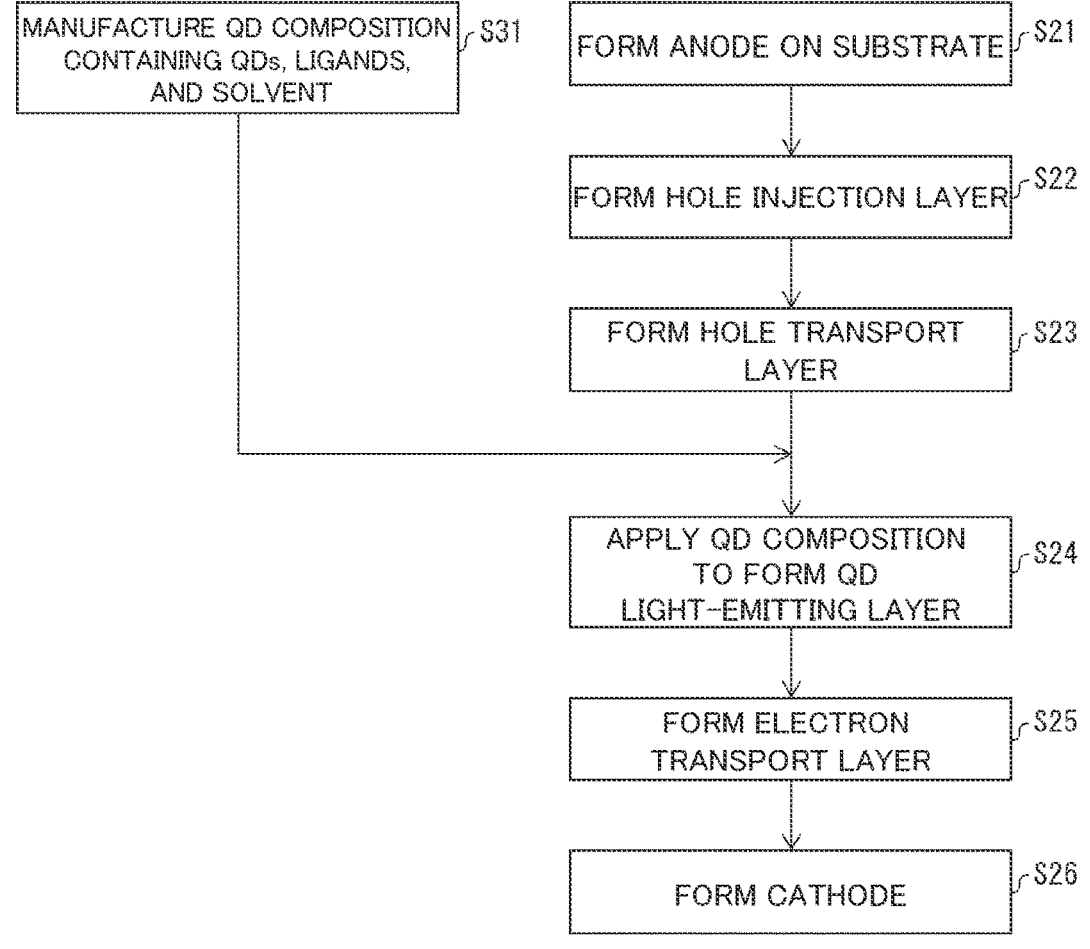
FIG. 11 is a flow chart representing an exemplary method of manufacturing a light-emitting element 50 in accordance with an embodiment of the present disclosure.

FIG. 11 is a flow chart representing an exemplary method of manufacturing the light-emitting element 50 in accordance with the present embodiment.

Referring to FIG. 11, in a method of manufacturing the light-emitting element 50 in accordance with the present embodiment, as an example, for example, first, the anode 52 is formed on the substrate 51 (step S21; anode forming step). Next, the hole injection layer 53 is formed on the anode 52 (step S22; hole injection layer forming step). Next, the hole transport layer 54 is formed on the hole injection layer 53 (step S23; hole transport layer forming step). Next, the QD light-emitting layer 55 is formed on the hole transport layer 54 by a solution technique. Specifically, the QD composition 31 in which the QDs 1 to which the target ligands 22 are coordinated are dissolved in the target solvent 33 is applied onto the hole transport layer 54 by spin-coating. Thereafter, the QD light-emitting layer 55 is formed by evaporating the solvent containing the target solvent 33 in baking (step S24; QD light-emitting layer forming step). Next, the electron transport layer 56 is formed on the QD light-emitting layer 55 (step S25; electron transport layer forming step). Next, the cathode 57 is formed on the electron transport layer 56 (step S26; cathode forming step). Note that the substrate 51 and a stack body (from the anode 52 to the cathode 57) formed on the substrate 51 may be sealed with a sealing member after the cathode 57 is formed in step S56.

The QD composition 31 used in step S24 is manufactured (prepared) in advance prior to step S24. Therefore, the method of manufacturing the light-emitting element 50 further includes a QD composition manufacturing step (step S31; QD composition manufacturing step) prior to step S24 as shown in FIG. 11. Step S31 includes at least steps S4 to S7 from steps S1 to S7 shown in FIG. 1.

The substrate 51 is a support body for forming the layers from the anode 52 to the cathode 57. The substrate 51 may be, for example, a glass substrate or a flexible substrate such as a plastic substrate or a plastic film.

The anode 52 and the cathode 57 are formed in steps S21 and S56 by, for example, sputtering, film vapor deposition, vacuum vapor deposition, or physical vapor deposition (PVD).

The anode 52 is an electrode that supplies holes to the QD light-emitting layer 55 under an applied voltage. The cathode 57 is an electrode that supplies electrons to the QD light-emitting layer 55 under an applied voltage.

Either one or both of the anode 52 and the cathode 57 is/are made of a light-transmitting material. Note any one of the anode 52 and the cathode 57 may be made of a light-reflecting material. The light-emitting element 50 allows extracting light on an electrode side made of a light-transmitting material.

The anode 52 is made of, for example, a material with a relatively large work function. Examples of such a material include tin-doped indium oxide (ITO), zinc-doped indium oxide (IZO), aluminum-doped zinc oxide (AZO), gallium-doped zinc oxide (GZO), and antimony-doped tin oxide (ATO). Any one of these materials may be used alone. Alternatively, two or more of them may be used in any combination.

The cathode 57 is made of, for example, a material with a relatively small work function. Examples of such a material include Al, silver (Ag), Ba, ytterbium (Yb), calcium (Ca), lithium (Li)—Al alloys, Mg—Al alloys, Mg—Ag alloys, Mg-indium (In) alloys, and Al-aluminum oxide ($Al_2O_3$) alloys.

The hole injection layer 53, the hole transport layer 54, and the electron transport layer 56 are formed in step S22, step S23, and step S24 respectively by, for example, sputtering, vacuum vapor deposition, PVD, spin-coating, or inkjet printing.

The hole injection layer 53 is a layer that transports holes from the anode 52 to the hole transport layer 54. The hole injection layer 53 may be made of, for example, an electrically conductive polymer material with a hole transportability such as poly(3,4-ethylenedioxythiophene) (PEDOT) or a compound (PEDOT:PSS) of poly(3,4-ethylenedioxythiophene) (PEDOT) and polystyrene sulfonate (PSS).

The hole transport layer 54 is a layer that transports holes from the hole injection layer 53 to the QD light-emitting layer 55. The hole transport layer 54 may be made of, for example, an electrically conductive polymer material with a hole transportability such as poly[(9,9-dioctylfluorenyl-2,7-diyl)-co-(4,4'-(N-(4-sec-butylphenyl)diphenylamine))] (TFB).

Note that the hole injection layer 53 and the hole transport layer 54 may be made of an inorganic material.

The electron transport layer 56 is a layer that transports electrons from the cathode 57 to the QD light-emitting layer 55. When the electron transport layer 56 is made of an inorganic material, the inorganic material may be, for example, a metal oxide containing at least one element selected from the group consisting of Zn, magnesium (Mg), titanium (Ti), silicon (Si), tin (Sn), tungsten (W), tantalum (Ta), barium (Ba), zirconium (Zr), aluminum (Al), yttrium (Y), and hafnium (Hf). Note that the inorganic material may be nanoparticles.

When the electron transport layer 56 is made of an organic material, the organic material may be, for example, 1,3,5-tris(1-phenyl-1-H-benzimidazol-2-yl)benzene (TPBi), 3-(biphenyl-4-yl)-5-(4-tert-butylphenyl)-4-phenyl-4H-1,2, 4-triazole (TAZ), bathophenanthroline (Bphen), or tris(2,4, 6-trimethyl-3-(pyridin-3-yl)phenyl)borane (3 TPYMB).

The QD light-emitting layer 55 is a light-emitting layer containing the QDs 1 and the target ligands 22 coordinated to the QDs 1.

In the light-emitting element 50, holes and electrons recombine in the QD light-emitting layer 55 due to a drive current between the anode 52 and the cathode 57, which generates excitons that emit light (fluorescence) in transitioning from the conduction band energy level (conduction band) to the valence band energy level (valence band) of the QDs 1.

The QD light-emitting layer 55 is formed by applying the QD composition 31 in which the QDs 1 to which the target ligands 22 are coordinated are dissolved in the target solvent 33 onto an underlayer thereof (onto the hole transport layer 54 in the example shown in FIG. 1) by a solution technique as described above.

As described above, if ligands are exchanged by using the target-ligand-substituting solvent 23, the purification step for the post-ligand exchange QDs 1 can be omitted. Therefore, the QD composition 31 may in some cases contain the target-ligand-substituting solvent 23 as, for example, a miniscule-amount component (impurity), after the isolation of the post-ligand exchange QDs 1 and the solvent exchange through the dissolution of the QDs 1 in the target solvent 33. Therefore, the QD light-emitting layer 55 may in some cases contain the target-ligand-substituting solvent 23 as an impurity as shown in FIG. 10, depending on, for example, the vaporization temperature and film-forming conditions of the target-ligand-substituting solvent 23.

However, the proportion of impurity in the QD light-emitting layer 55 is preferably as low as possible in view of luminous efficiency. Therefore, when the QD light-emitting layer 55 contains the target-ligand-substituting solvent 23, the proportion of the target-ligand-substituting solvent 23 to the total amount of the QDs 1 and the target-ligand-substituting solvent 23 in the QD light-emitting layer 55 is preferably 1 wt % or lower in weight ratio (i.e., from 0 exclusive to 1 wt % inclusive) as described above.

Note that unarguably, as described above, the QD composition 31 containing no target-ligand-substituting solvent 23 can be obtained by completely removing the target-ligand-substituting solvent 23 when the QDs 1 to which the target ligands 22 are coordinated are isolated in aforementioned step S6. When this is the case, the resultant QD light-emitting layer 55 contains no target-ligand-substituting solvent 23.

The QD composition 31 in accordance with the present embodiment enables omitting the purification step, but contains no excess ligands as an impurity, as described above. Therefore, the QD light-emitting layer 55 also contains no excess ligands as an impurity.

Therefore, in any case, the present embodiment can provide the light-emitting element 50, with improved luminescence properties over known light-emitting elements, including the QD light-emitting layer 55, containing no excess ligands not coordinated to the QDs 1 as ligands, that achieves an improved purification efficiency over known QD light-emitting layers and that restrains damage to the QDs 1 caused by the repeated removal of excess ligands in comparison with known QD light-emitting layers.

The present disclosure is not limited to the description of the embodiments above and may be altered within the scope of the claims. Embodiments based on a proper combination of technical means disclosed in different embodiments are encompassed in the technical scope of the present disclosure. Furthermore, new technological features can be created by combining different technical means disclosed in the embodiments.

Reference Signs List

The invention claimed is:

1. A method of exchanging ligands, the method comprising:
   mixing a quantum dot composition, in which first ligands and quantum dots are dissolved in a water solvent, with a first organic solvent, in which second ligands are dissolved, to replace the first ligands with the second ligands, wherein:
   the second ligands do not dissolve in the water solvent and are soluble in different solvents depending on whether the second ligands are coordinated to the quantum dots, and
   the first organic solvent dissolves the second ligands that are not coordinated to the quantum dots, and does not dissolve the second ligands that are coordinated to the quantum dots.

2. The method of exchanging ligands according to claim 1, further comprising:
   after mixing the quantum dot composition with the first organic solvent, phase-separating the quantum dots to which the second ligands are coordinated.

3. The method of exchanging ligands according to claim 2, wherein phase-separating the quantum dots comprises phase-separating:
   the water solvent in which the first ligands are dissolved,
   the first organic solvent in which one or more second ligands, among the second ligands, that are in excess and that are not coordinated to the quantum dots are dissolved, and
   the quantum dots to which the second ligands are coordinated.

4. The method of exchanging ligands according to claim 2, wherein phase-separating the quantum dots is performed by precipitation or centrifugation.

5. The method of exchanging ligands according to claim 2, further comprising, after the phase-separating:
   removing the first ligands and one or more second ligands, among the second ligands, that are in excess and that are not coordinated to the quantum dots together with the water solvent and the first organic solvent, to isolate the quantum dots to which the second ligands are coordinated.

6. The method of exchanging ligands according to claim 1, further comprising:
   before mixing the quantum dot composition with the first organic solvent:
   mixing another quantum dot composition, in which third ligands and the quantum dots are dissolved in a third organic solvent, with the water solvent, in which the first ligands are dissolved, to replace the third ligands with the first ligand; and
   isolating the quantum dots, to which the first ligands are coordinated, and dissolving the isolated quantum dots in another water solvent to manufacture the quantum dot composition.

7. The method of exchanging ligands according to claim 1, wherein the first ligands are a compound that contains a functional group coordinated to the quantum dots, that is separable into quaternary ammonium ions and chloride ions, and that contains 6 or fewer carbon atoms per molecule.

8. The method of exchanging ligands according to claim 1, wherein the first ligands are at least one compound selected from the group consisting of 2-aminoethanethiol hydrochloride, 2-methane aminoethanethiol hydrochloride, 2-ethane aminoethanethiol hydrochloride, 2-dimethylaminoethanethiol hydrochloride, 2-methylethylaminoethanethiol hydrochloride, and 2-diethylaminoethanethiol hydrochloride.

9. The method of exchanging ligands according to claim 1, wherein the second ligands are at least one compound selected from the group consisting of alkyl-based linear fatty acid, alkyl-based linear thiol, and alkyl-based linear amine.

10. The method of exchanging ligands according to claim 1, wherein the second ligands are at least one compound selected from the group consisting of oleic acid, nonanoic acid, mystiric acid, pentanoic acid, dodecane thiol, hexadecane thiol, and octyl amine.

11. The method of exchanging ligands according to claim 1, wherein the first organic solvent is at least one compound selected from the group consisting of dimethyl sulfoxide, acetonitrile, N,N-dimethyl formamide, methanol, ethanol, propylene glycol monomethyl ether acetate, acetone, and isopropyl alcohol.

12. The method of exchanging ligands according to claim 1, wherein the first organic solvent is either one or both of propylene glycol monomethyl ether acetate and isopropyl alcohol.

\* \* \* \* \*